(12) United States Patent
Oesterling et al.

(10) Patent No.: US 10,377,345 B1
(45) Date of Patent: Aug. 13, 2019

(54) CONFIGURATION OF A VEHICLE FOR USE IN A VEHICLE RESERVATION NETWORK

(71) Applicant: GM GLOBAL TECHNOLOGY OPERATIONS LLC, Detroit, MI (US)

(72) Inventors: Christopher L. Oesterling, Troy, MI (US); Erik M. Elbieh, Royal Oak, MI (US); Hrushit B. Raval, Clinton Township, MI (US); Donald K. Grimm, Utica, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/985,585

(22) Filed: May 21, 2018

(51) Int. Cl.
| | | |
|---|---|---|
| *B60R 25/24* | (2013.01) | |
| *B60R 25/04* | (2013.01) | |
| *H04W 4/40* | (2018.01) | |
| *H04W 4/80* | (2018.01) | |
| *G06Q 50/30* | (2012.01) | |
| *B60R 25/40* | (2013.01) | |
| *G06Q 10/02* | (2012.01) | |

(52) U.S. Cl.
CPC ............ *B60R 25/241* (2013.01); *B60R 25/04* (2013.01); *B60R 25/403* (2013.01); *G06Q 10/02* (2013.01); *G06Q 50/30* (2013.01); *H04W 4/40* (2018.02); *H04W 4/80* (2018.02)

(58) Field of Classification Search
CPC ..... B60R 25/241; B60R 25/04; B60R 25/403; G06Q 30/0645
See application file for complete search history.

(56) References Cited

U.S. PATENT DOCUMENTS

| | | | | |
|---|---|---|---|---|
| 8,841,987 | B1* | 9/2014 | Stanfield | G07C 9/00857 340/5.61 |
| 2009/0212978 | A1* | 8/2009 | Ramseyer | G06Q 10/02 340/989 |
| 2010/0063904 | A1* | 3/2010 | Ronen | G01C 21/26 705/30 |
| 2013/0338883 | A1* | 12/2013 | Savoure | H04L 9/3234 701/49 |

(Continued)

*Primary Examiner* — Thomas D Alunkal
(74) *Attorney, Agent, or Firm* — Reising Ethington P.C.; David Willoughby

(57) ABSTRACT

A plug-in vehicle electronics module for use in vehicle sharing systems, and a method and system for using the vehicle electronics module. The vehicle electronics module includes an on-board diagnostic (OBD) connector and a housing that contains: a short-range wireless communication (SRWC) circuit; a microcontroller; and memory communicatively coupled to the microcontroller, wherein the memory stores a computer program; wherein the vehicle electronics module is connectable by the OBD connector to an OBD port on a vehicle; and wherein, when the vehicle electronics module is connected to the OBD port, the microcontroller operates under control of the computer program to cause the vehicle electronics module to: establish a short-range wireless communication (SRWC) connection with a personal SRWC device using the SRWC circuit; authenticate the personal SRWC device in response to receiving authentication information over the established SRWC connection; and in response to the successful authentication, provide access to the vehicle.

13 Claims, 6 Drawing Sheets

(56) References Cited

U.S. PATENT DOCUMENTS

| | | | |
|---|---|---|---|
| 2014/0156110 A1* | 6/2014 | Ehrman | G06Q 30/0645 |
| | | | 701/2 |
| 2014/0266594 A1* | 9/2014 | Reiser | B60R 25/24 |
| | | | 340/5.72 |
| 2017/0178035 A1* | 6/2017 | Grimm | H04L 63/061 |

* cited by examiner

CONFIGURATION OF A VEHICLE FOR USE IN A VEHICLE RESERVATION NETWORK

INTRODUCTION

The present invention relates to configuring a vehicle for use in a vehicle sharing network and enabling access to the vehicle as a part of a vehicle reservation.

Vehicles include hardware and software capable of obtaining and processing various information, including information that is obtained by vehicle system modules (VSMs). Moreover, vehicles include networking capabilities and can be connected to a vehicle backend server that maintains accounts for users and their vehicles. Users may allow another user to borrow their vehicle or to lease their vehicle as a part of a peer-to-peer (P2P) vehicle sharing network. However, configuring a vehicle to be ready for use with a P2P vehicle sharing network can be difficult for individuals without the proper training and technical background.

SUMMARY

According to one aspect of the invention, there is provided a plug-in vehicle electronics module for use in vehicle sharing systems, including an on-board diagnostic (OBD) connector and a housing that contains: a short-range wireless communication (SRWC) circuit; a microcontroller; and memory communicatively coupled to the microcontroller, wherein the memory stores a computer program; wherein the vehicle electronics module is connectable by the OBD connector to an OBD port on a vehicle; and wherein, when the vehicle electronics module is connected to the OBD port, the microcontroller operates under control of the computer program to cause the vehicle electronics module to: (i) establish a short-range wireless communication (SRWC) connection with a personal SRWC device using the SRWC circuit; (ii) authenticate the personal SRWC device in response to receiving authentication information over the established SRWC connection; and (iii) in response to the successful authentication of the personal SRWC device: (a) send a door unlock command to at least one VSM of the vehicle in response to the successful authentication of the personal SRWC device; and (b) enable a vehicle user to start a primary propulsion system of the vehicle According to various embodiments, this vehicle electronics module may further include any one of the following features or any technically-feasible combination of some or all of these features:

- the vehicle electronics module is an aftermarket device;
- the OBD connector is an OBD II connector that receives electrical charge from the vehicle when the OBD II connector is coupled to the OBD port of the vehicle;
- the OBD II connector provides for communication between the at least one vehicle system module (VSM) of the vehicle and the vehicle electronics module when connected to the OBD port of the vehicle;
- the microcontroller, when executing the computer program, further causes the vehicle electronics module to enable the vehicle user to start the primary propulsion system of the vehicle by locally sending a vehicle disable block (VDB) clear command to the at least one VSM; and/or
- the microcontroller, when executing the computer program, further causes the vehicle electronics module to prevent the vehicle from starting the primary propulsion system of the vehicle by locally sending a vehicle disable block (VDB) set command to the at least one VSM when the vehicle user locks the vehicle.

According to another aspect of the invention, there is provided a plug-in vehicle electronics module for use in vehicle sharing systems, including a power supply and a housing that contains: a keyfob circuit that includes a radio frequency (RF) transmitter; a microcontroller; and memory communicatively coupled to the microcontroller, wherein the memory stores a computer program; wherein the vehicle electronics module is connectable by the power supply to an auxiliary power source on a vehicle; and wherein, when the vehicle electronics module is connected to the auxiliary power source, the microcontroller operates under control of the computer program to cause the vehicle electronics module to: (i) establish a short-range wireless communication (SRWC) connection with a personal SRWC device using the SRWC circuit; (ii) authenticate the personal SRWC device in response to receiving authentication information over the established SRWC connection; and (iii) in response to the successful authentication of the personal SRWC device: (a) power the keyfob circuit, wherein the powering of the keyfob circuit causes a passive entry passive start (PEPS) module to unlock a vehicle door of the vehicle; and (b) enable a vehicle user to start a primary propulsion system of the vehicle.

According to various embodiments, this vehicle electronics module may further include any one of the following features or any technically-feasible combination of some or all of these features:

- a battery that supplies power to the microcontroller when power is not being supplied by the power supply;
- the power supply provides electrical charge from the auxiliary power source of the vehicle to the microcontroller when the power supply is coupled to the auxiliary power source and when vehicle electronics of the vehicle is in a powered on mode such that power is being supplied to the auxiliary power source;
- the vehicle electronics module is configured to charge the battery using the auxiliary power source of the vehicle via the power supply when the vehicle is in a powered on mode such that power is being supplied to the auxiliary power source;
- light emitting diode (LED) indicators, wherein the microcontroller controls the emission of light through the LED indicators;
- the microcontroller, when executing the computer program, further causes the vehicle electronics module to transmit an advertisement from the SRWC circuit;
- the microcontroller, when executing the computer program, further causes the vehicle electronics module to establish a second short-range wireless communication (SRWC) connection with another vehicle electronics module that is connected to an on-board diagnostics (OBD) port of the vehicle; and/or
- a global navigation satellite system (GNSS) receiver.

According to another aspect of the invention, there is provided a method of enabling a vehicle to be operated as a part of a vehicle reservation, the method including: establishing a short-range wireless communication (SRWC) connection with a personal SRWC device; receiving reservation information at a vehicle electronics module, wherein the vehicle electronics module is an aftermarket device and is separate from the original equipment manufacturer (OEM) vehicle electronics; carrying out an authentication process with the personal SRWC device using the vehicle electronics module, wherein the authentication process is carried out over the established SRWC connection; and upon successful authentication of the personal SRWC device: sending a door unlock command to the vehicle; and enabling the vehicle for starting a primary propulsion system of the vehicle.

According to various embodiments, this method may further include any one of the following features or any technically-feasible combination of some or all of these features:
- transmitting an advertisement in response to receiving the reservation information, and wherein the establishing step is carried out after the personal SRWC device responds to the advertisement;
- the enabling step includes sending a vehicle disable block (VDB) clear command to the vehicle;
- the vehicle electronics module includes an on-board diagnostics II (OBD II) connector;
- the vehicle electronics module includes a power supply that is configured to connect to an auxiliary power port, and wherein the vehicle electronics module includes a keyfob circuit; and/or
- the enabling step includes powering the keyfob circuit upon successful authentication of the personal SRWC device.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

Figure 1:
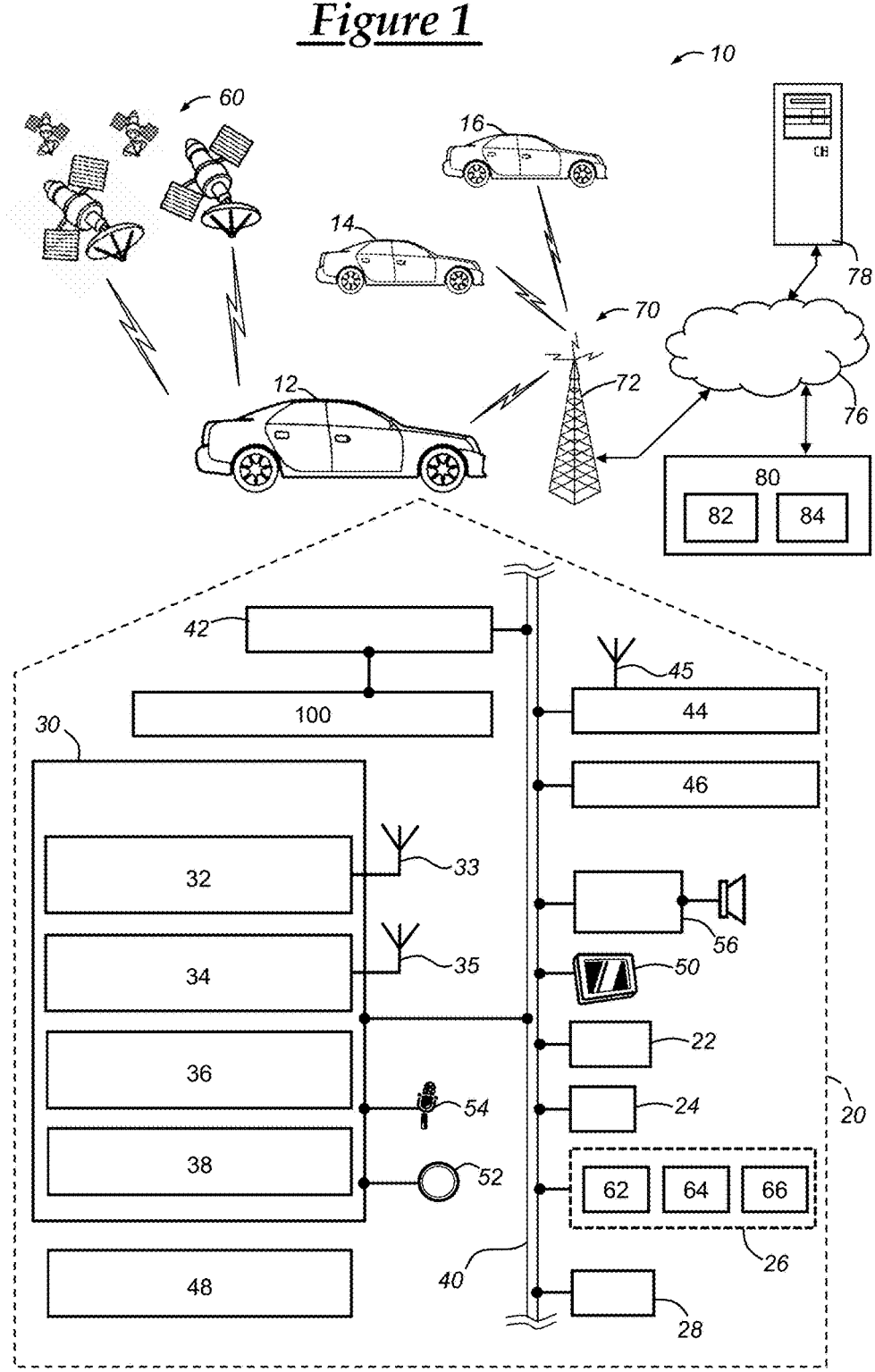
FIG. 1 is a block diagram depicting an embodiment of a communications system that is capable of utilizing the method disclosed herein.

The system and method described below enables a vehicle to be configured for use in a peer-to-peer vehicle sharing network. The system and method can be used with a peer-to-peer (P2P) vehicle sharing network that permits owners or their authorized agents (i.e., the vehicle managers) to rent out their vehicles to other users (i.e., the vehicle renters). A P2P vehicle manager can indicate the availability of the vehicle through sending vehicle availability information to a remote facility (e.g., a vehicle backend services facility) and, in response, the vehicle can be advertised for reservation or rental on a vehicle-device application. The vehicle renter can then request to reserve the vehicle and the remote facility can then establish a reservation (or confirm the reservation). The remote facility can then issue a vehicle key, such as a virtual vehicle key, to the vehicle renter, which can be used to access and control the vehicle. A P2P vehicle renter and/or a P2P vehicle manager can be referred to as a peer-to-peer (P2P) user.

An individual may desire to be a part of the P2P vehicle sharing network as a P2P vehicle manager in which to rent out or lease their vehicle to P2P vehicle renters. However, the vehicle that the individual intends to use as a part of the P2P vehicle sharing network might not include suitable hardware or otherwise be configured for acting as a P2P vehicle within the P2P vehicle sharing network. For example, the P2P vehicle sharing network may utilize virtual vehicle keys that can be distributed to P2P vehicle renters upon the establishment of a vehicle reservation. These virtual vehicle keys can be used by the P2P vehicle renter through a vehicle-device application on a personal SRWC device (e.g., smartphone) of the P2P vehicle renter. However, the P2P vehicle may require certain hardware and/or other configurations to work or otherwise function with the virtual vehicle key. Typically, the introduction and/or configuration of the P2P vehicle that is being introduced into the P2P vehicle sharing network entails technically difficult procedures that cannot be sufficiently performed by individuals without suitable training. Thus, there is provided various embodiments of a plug-in vehicle electronics module (or vehicle sharing module) that can, at least in some embodiments, be readily introduced into the vehicle and installed by individuals in a plug-and-play (PnP) manner and/or without having to execute technically-difficult steps.

In one embodiment, a first vehicle electronics module is provided that includes a short-range wireless communication (SRWC) circuit, a microcontroller, memory, and an on-board diagnostic (OBD) connector. This first vehicle electronics module can be installed (or plugged) into an OBD port of the vehicle, which can be used for data communications and to power the first vehicle electronics module. The first vehicle electronics module can then be setup or otherwise configured for use with the vehicle, which can include registering the vehicle electronics module with a remote facility and/or the vehicle. Once registered, the vehicle is ready to be used as a P2P vehicle as a part of the P2P vehicle sharing network. Thereafter, a P2P vehicle reservation process can be carried out for the P2P vehicle in which reservation information is generated and/or obtained at a remote facility, and then distributed to the P2P vehicle and/or the P2P vehicle renter. After the P2P vehicle renter arrives at the P2P vehicle, the first vehicle electronics module can establish a secure SRWC connection, such as a Bluetooth™ Low Energy (BLE) connection, with a personal SRWC device of a P2P vehicle renter. The P2P vehicle renter can then be authenticated over the established SRWC connection, and the vehicle electronics module can then permit the P2P vehicle renter to access the P2P vehicle once the authentication has been verified. Once authentication is successfully completed, the vehicle can then be started by the P2P vehicle renter.

In another embodiment, a second vehicle electronics module is provided that includes a short-range wireless communication (SRWC) circuit, a microcontroller, memory, a keyfob circuit, a power supply, and a backup battery. The power supply can include a connector that mates with an auxiliary power port (e.g., a cigarette lighter socket, a Universal Serial Bus (USB) socket) of the vehicle such that it can pull power from the vehicle battery. The second vehicle electronics module can also include a keyfob circuit that can be powered by the vehicle electronics module in response to successfully authenticating a P2P vehicle renter (or a personal SRWC device of the P2P vehicle renter). This keyfob circuit can be used to unlock the vehicle doors and/or can be enabled such that the vehicle can be started through use of a vehicle start pushbutton. In an alternative embodiment, the second vehicle electronics module can be used with the first vehicle electronics module, although the particular configuration of the first vehicle electronics module may differ when used in this way as opposed to when the first vehicle electronics module is used by itself. Either or both of the first vehicle electronics module and the second vehicle electronics module can be used with a passive entry passive start (PEPS) vehicle.

In yet another embodiment, the first vehicle electronics module or the second vehicle electronics module can be used with a non-PEPS-vehicle (i.e., a vehicle that does not include a PEPS module). In these embodiments, a short-range wireless communication (SRWC) lockbox (a SRWC-lockbox) can be included in the vehicle. A physical vehicle key can be included within a lockable compartment of the SRWC-lockbox. Upon a P2P vehicle renter approaching the vehicle, a SRWC connection can be established between the vehicle electronics module and a personal SRWC device of the P2P vehicle renter. Upon establishment of the SRWC connection, the vehicle electronics module can authenticate the personal SRWC device and, upon successful verification, the vehicle electronics module can unlock the vehicle and send an unlock command or message to the SRWC-lockbox thereby permitting the user to enter the vehicle and obtain the vehicle key.

Figure 3:
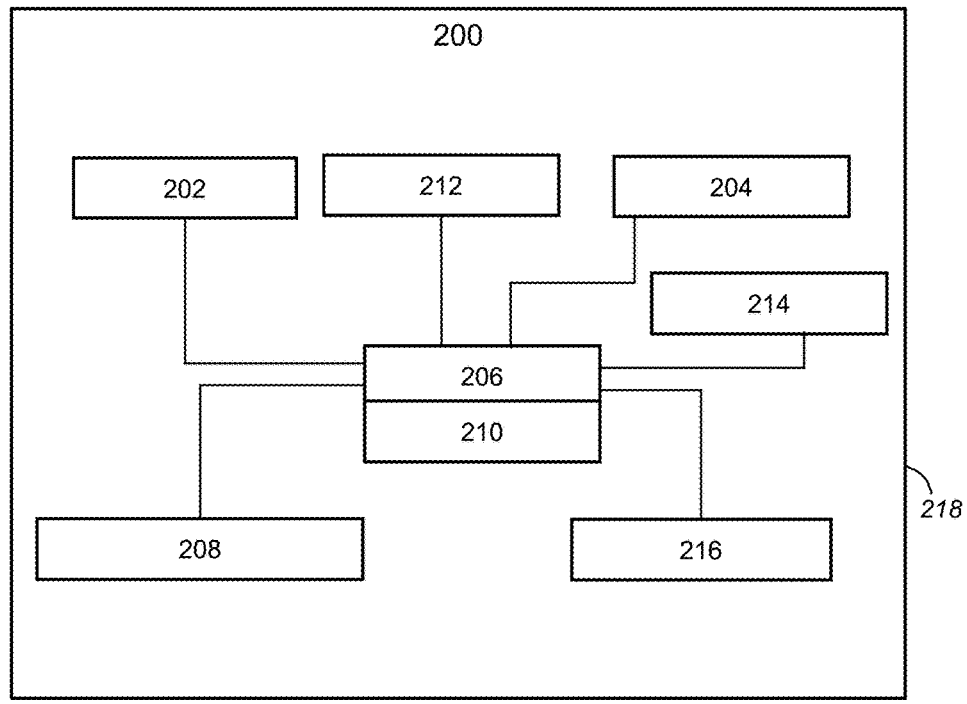
FIG. 3 is a block diagram depicting another embodiment of a vehicle electronics module.
Figure 4:
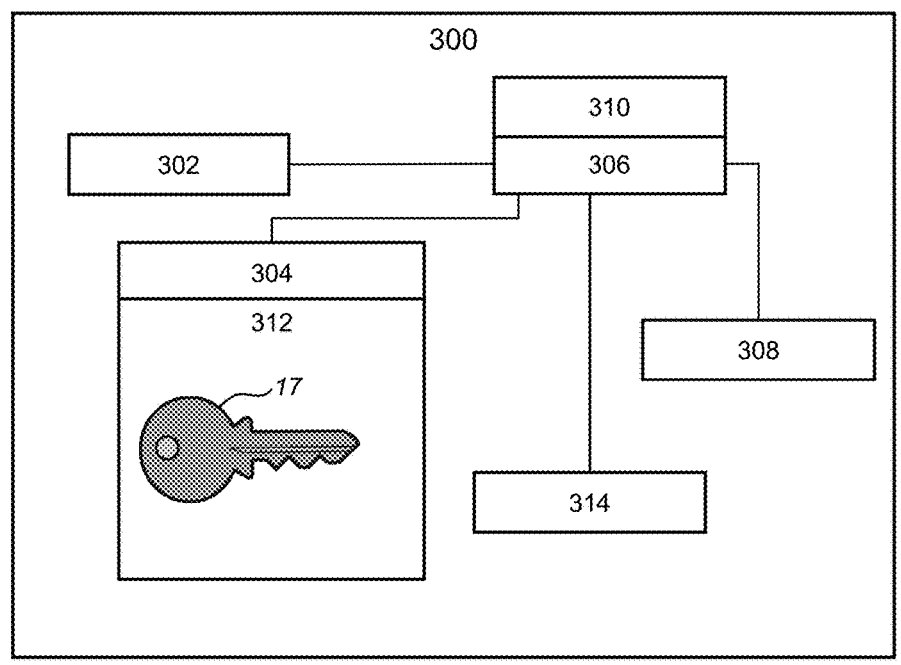
FIG. 4 is a block diagram depicting an embodiment of a short-range wireless communication (SRWC) lockbox.

With reference to FIG. 1, there is shown an operating environment that comprises a communications system 10 and that can be used to implement the method disclosed herein. Communications system 10 generally includes at least one vehicle, a constellation of global navigation satellite system (GNSS) satellites 60, one or more wireless carrier systems 70, a land communications network 76, a computer or server 78, and a vehicle backend services facility 80. The at least one vehicle can include, for example, any one or more of a first passive entry passive start (PEPS) vehicle 12 with a PEPS module and a vehicle electronics module 100, a second PEPS-vehicle 14 with a PEPS module and a vehicle electronics module 200 (FIG. 3), and/or a non-PEPS-vehicle 16 with a lockbox 300 (FIG. 4). It should be understood that the disclosed method can be used with any number of different systems and is not specifically limited to the operating environment shown here. Thus, the following paragraphs simply provide a brief overview of one such communications system 10; however, other systems not shown here could employ the disclosed method as well.

PEPS-vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft including unmanned aerial vehicles (UAVs), etc., can also be used. It should be appreciated that vehicles 14 and 16 can include the same vehicle electronics as vehicle electronics 20 of vehicle 12, although the vehicle electronics of these vehicles is not separately depicted and separately discussed. Also, the vehicle electronics of the vehicles 14 and 16 differ somewhat from vehicle 12, which is discussed in more detail below.

Some of the vehicle electronics 20 are shown generally in FIG. 1 and includes a global navigation satellite system (GNSS) receiver 22, a body control module or unit (BCM) 24, an engine control module (ECM) 26, other vehicle system modules (VSMs) 28, a wireless communications device 30, an on-board diagnostics II (OBD II) port 42, a vehicle electronics module 100, and vehicle-user interfaces 50-56. Some or all of the different vehicle electronics may be connected for communication with each other via one or more communication busses, such as communications bus 40. The communications bus 40 provides the vehicle electronics with network connections using one or more network protocols and can use a serial data communication architecture. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications, to name but a few.

The vehicle 12 can include numerous vehicle system modules (VSMs) as part of vehicle electronics 20, such as the GNSS receiver 22, BCM 24, ECM 26, wireless communications device 30, vehicle electronics module 100, and vehicle-user interfaces 50-56, as will be described in detail below. In other embodiments, the vehicle 12 can include a second vehicle electronics module 200 (not shown in FIG. 1), which can be used in conjunction with the vehicle electronics module 100. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is preferably connected by communications bus 40 to the other VSMs, as well as to the wireless communications device 30, and can be programmed to run vehicle system and subsystem diagnostic tests. Moreover, each of the VSMs can include and/or be communicatively coupled to suitable hardware that enables intra-vehicle communications to be carried out over the communications bus 40; such hardware can include, for example, bus interface connectors and/or modems. One or more VSMs 28 (and/or the vehicle electronics modules 100 and/or 200) may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the above-mentioned VSMs are only examples of some of the modules that may be used in vehicle 12, as numerous others are also possible.

Global navigation satellite system (GNSS) receiver 22 receives radio signals from a constellation of GNSS satellites 60. The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites 60. And, in another example, GNSS receiver 22 can be a BDS receiver that receives a plurality of GNSS (or BDS) signals from a constellation of GNSS (or BDS) satellites 60. In either implementation, GNSS receiver 22 can include at least one processor and memory, including a non-transitory computer readable memory storing instructions (software) that are accessible by the processor for carrying out the processing performed by the receiver 22.

Body control module (BCM) 24 can be used to control various VSMs of the vehicle, as well as obtain information concerning the VSMs, including their present state or status, as well as sensor information. The BCM 24 is shown in the exemplary embodiment of FIG. 1 as being electrically coupled to the communication bus 40. In some embodiments, the BCM 24 may be integrated with or part of a center stack module (CSM) and/or integrated with wireless communications device 30. Or, the BCM may be a separate device that is connected to other VSMs via bus 40. The BCM 24 can include a processor and/or memory, which can be similar to processor 36 and memory 38 of wireless communications device 30, as discussed below. The BCM 24 may communicate with wireless device 30 and/or one or more vehicle system modules, such as the engine control module (ECM) 26, the vehicle electronics module 100, audio system 56, or other VSMs 28; in some embodiments, the BCM 24 can communicate with these modules via the communications bus 40. In other embodiments, the BCM 24 can communicate with SRWC devices, such as the vehicle electronics module 200, via wireless communications device 30, which can use the SRWC circuit 32 and the communications bus 40. The BCM 24 may include a processor and memory accessible by the processor. Software stored in the memory and executable by the processor enables the BCM to direct one or more vehicle functions or operations including, for example, controlling central locking, air conditioning, power mirrors, controlling the vehicle primary mover (e.g., engine, primary propulsion system), and/or controlling various other vehicle modules.

Also, the BCM 24 can set a vehicle disable block (VDB) that, when set, disallows the vehicle 12 from being started. The vehicle disable block (VDB) can be set locally, for example, by the vehicle electronics module 100 (as discussed below). Or, the vehicle disable block can be set remotely by, for example, the remote facility 80 or computer 78. When the VDB is set (either remotely or locally), the BCM 24 can inhibit or prevent vehicle start commands from actually starting the primary propulsion system of the vehicle. The vehicle disable block (VDB) can be set locally by the vehicle electronics module 100 via sending a command (a local VDB command) through the OBD II port and the communications bus 40. Also, the VDB can be set remotely by a remote facility (e.g., remote facility 80) through sending wireless signals over the wireless carrier system 70 and/or land network 76 (or through use of other remote communications) that then prevents the primary propulsion system of the vehicle from being started. When the VDB is set remotely, a remote VDB command can be received at the wireless communications device 30 from the remote facility 80.

Engine control module (ECM) 26 may control various aspects of engine operation such as fuel ignition and ignition timing. The ECM 26 is connected to the communications bus 40 and may receive operation instructions (or vehicle commands) from the BCM 24 or other vehicle system modules, such as the wireless communications device 30 or other VSMs 28. In one scenario, the ECM 26 may receive a command from the BCM to start the vehicle—i.e., initiate the vehicle ignition or other primary propulsion system (e.g., a battery powered motor). Moreover, the ECM 26 can be used as an onboard vehicle sensor that can obtain vehicle sensor information of the vehicle engine, such as from engine speed sensor 62, engine temperature sensor 64, and engine ignition timing sensor 66, all of which are also onboard vehicle sensors. In embodiments when the vehicle is a hybrid or electric vehicle, the ECM 26 can be used to obtain status information regarding the primary mover (including electrical motor(s) and battery information).

On-board diagnostics II (OBD II) port 42 is a connector that, in general, can be used to obtain diagnostic information from the vehicle 12. The OBD II port 42 can be connected to the communications bus 40 and can be a female connector configured for receiving a mating male connector containing a plurality of pins. In many embodiments, the OBD II port 42 can be a hardware interface according to the SAE J1962 specification, and can be a type A or type B connector according to the SAE J1962 specification. In various embodiments, the OBD II port 42 can include 16 pin slots for receiving pins from a male OBD II connector, such as the OBD II connector 104 (FIG. 2) of the vehicle electronics module 100. The OBD II port can be communicatively coupled to the communications bus 40 and can permit communications between a device that is physically connected to the OBD II port and vehicle system modules (VSMs), such as VSMs 28, BCM 24, ECM 26, and wireless communications device 30. The OBD II port 42 can provide electrical power to the vehicle electronics module 100 whether or not the vehicle is in a powered on state (assuming the vehicle battery has sufficient power). However, in other embodiments, the OBD II port may only provide power (or electrical charge) to the vehicle electronics module 100 when the vehicle is in a powered on state.

As used herein, a "powered on state" is a state of the vehicle in which the ignition or primary propulsion system of the vehicle is powered on and, as used herein, a "powered off state" is a state of the vehicle in which the ignition or primary propulsion system of the vehicle is not powered on. Moreover, the powered on state can include instances in which the auxiliary electronics of the vehicle, such as the auxiliary power port 48, is supplied with electrical power. For example, this auxiliary power mode may be when a physical key and/or an operational state of the vehicle electronics is in an accessory (ACC) position/mode that then supplies certain vehicle electronics with electrical charge or power.

A passive entry passive start (PEPS) module 44 is another type of VSM that can be connected to the vehicle bus 40 and provide passive detection of the absence or presence of a passive physical key or a virtual vehicle key (both of which are considered a passive vehicle key as used herein). A vehicle key can include a passive vehicle key or a conventional (or non-passive) vehicle key. A passive physical key can be a tangible keyfob or a keyfob circuit, such as the keyfob circuit 214 of the vehicle electronics module 200 (FIG. 3). A virtual vehicle key can be information or data that is used by a SRWC device, such as the personal SRWC device 90, that includes information imitating that of a passive physical key, or that is otherwise authenticated and authorized for use with the vehicle 12. The PEPS module 44 can use include a dedicated antenna 45, or may utilize other antennas of the vehicle electronics 20. When a vehicle key comes within a predetermined distance of the vehicle 12, the PEPS module 44 can determine whether the vehicle key belongs to the vehicle 12 and/or, in some embodiments, can determine whether the vehicle key is authorized and/or authentic (i.e., is authenticated). For example, the PEPS module 44 can compare a stored digital certificate (or other authentication information) to a digital certificate (or other authentication information) received from a vehicle key. The digital certificate or other authentication information can be stored in memory of the PEPS module 44 and/or another VSM, such as the BCM 24. When it is determined that the virtual vehicle key is authentic (e.g., the certificate or other authenticating information matches), the PEPS module 44 can send a command to the BCM 24 permitting access to the vehicle 12; for example, the PEPS module 44 can send a door unlock command to the BCM 24.

In other implementations, it is possible for the BCM 24 to carry out the functionality attributed to the PEPS module 44. And, in at least some embodiments, the PEPS module 44 can transmit a radio frequency (RF) signal once a vehicle start pushbutton is pressed (and/or a brake pedal is engaged). This RF signal can be received by a passive vehicle key (e.g., the keyfob circuit 214 of the vehicle electronics module 200), which can then send a response back to the PEPS module 44. At this time, the PEPS module 44 can verify the response and, if successful, the PEPS module 44 can permit the vehicle to start (i.e., the engine or other primary propulsion system to start or become enabled).

Vision sensor(s) 46 are each an onboard vehicle sensor and may be any type of sensor that obtains visual or spatial information concerning an area within or surrounding the vehicle 12. For example, the vision sensor(s) 46 can be cameras, radars, lidars, etc. The data obtained by the vision sensor(s) 46 may be sent to another vehicle system module (VSM) such as wireless communications device 30 and/or BCM 24 via communications bus 40. In one embodiment, the vision sensor(s) 46 include an electronic digital camera that is powered through use of a vehicle battery. The electronic digital camera may include a memory device and a processing device to store and/or process data that it captures or otherwise obtains, and can be any suitable camera type (e.g., charge coupled device (CCD), complementary metal oxide semiconductor (CMOS), etc.) with any suitable lens.

The vision sensor(s) 46 can be used to capture photographs, videos, and/or other information pertaining to light, which is collectively referred to herein as vision data and which is a particular type of vehicle sensor data. In one embodiment, the vision data can be image data, which is vision data that can be represented in a pixel array and can be captured using interlacing or progressive scanning techniques, as well as other similar or suitable techniques. The image data can be captured at a set or pre-configured scanning or sampling frequency, and the vision sensor(s) may be configured to obtain image data of a particular resolution. Once the image data is obtained through using the vision sensor(s) 46, the image data (or other vision data) can be processed and then sent to one or more other VSMs, including the wireless communications devices 30 and/or the BCM 24. The vision sensor(s) 46 can include processing capabilities that enable image processing techniques, including object recognition techniques, to be carried out at the vision sensor(s) 46. Or, in other embodiments, the cameras may send raw or formatted image data to another VSM, such as device 30 (or other central vehicle computer), which can then perform the image processing techniques.

Auxiliary power port 48 can be any type of port that can be used to provide power from a vehicle battery. The auxiliary power port 48 can be a cigarette lighter socket, a universal serial bus (USB) port, a coaxial direct current (DC) input, a power outlet (e.g., a 120-Volt power outlet), and/or various other ports or connectors that are electrically coupled to the vehicle battery such that electrical charge from the vehicle battery can be supplied thereto. For example, in the case of the second PEPS-vehicle 14, the vehicle electronics module 200 can be connected to the auxiliary power port 48 and electrical charge (or power) can be delivered from the vehicle battery to the vehicle electronics module 200 via the auxiliary power port 48. And, in the case of non-PEPS vehicle 16 (discussed below), the vehicle 14 can include a BLE-lockbox 300 (FIG. 4) that can be coupled to the power port 48 and that can receive power from the vehicle battery via the power port 48. In many embodiments, the auxiliary power port 48 may only be supplied power from the vehicle battery when the vehicle is in a powered on state. Moreover, the power obtained by the vehicle electronics module 200 (or the SRWC-lockbox) can be used to charge a battery included therein, such as the battery 212 of the vehicle electronics module 200 (FIG. 3).

Wireless communications device 30 is capable of communicating data via short-range wireless communications (SRWC) through use of SRWC circuit 32 and/or via cellular network communications through use of a cellular chipset 34, as depicted in the illustrated embodiment. In one embodiment, the wireless communications device 30 is a central vehicle computer that can be used to carry out various vehicle tasks. In the illustrated embodiment, wireless communications device 30 includes an SRWC circuit 32, a cellular chipset 34, a processor 36, memory 38, and antennas 33 and 35. In one embodiment, wireless communications device 30 may be a standalone module or, in other embodiments, device 30 may be incorporated or included as a part of one or more other vehicle system modules, such as a center stack module (CSM), body control module (BCM) 24, an infotainment module, a head unit, and/or a gateway module. In some embodiments, the device 30 can be implemented as an OEM-installed (embedded) or aftermarket device that is installed in the vehicle. In some embodiments, the wireless communications device 30 is a telematics unit (or telematics control unit) that is capable of carrying out cellular communications using one or more cellular carrier systems 70. Or, in other embodiments, a separate telematics unit can be included in the vehicle and communicatively coupled to the wireless communications device 30. The telematics unit can be integrated with the GNSS receiver 22 so that, for example, the GNSS receiver 22 and the wireless communications device (or telematics unit) 30 are directly connected to one another as opposed to being connected via communications bus 40.

In some embodiments, the wireless communications device 30 can be configured to communicate wirelessly according to one or more short-range wireless communications (SRWC) such as any of the Wi-Fi™, WiMAX™, Wi-Fi™ Direct, other IEEE 802.11 protocols, ZigBee™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication (SRWC) circuit 32 enables the wireless communications device 30 to transmit and receive SRWC signals, such as BLE signals. The SRWC circuit may allow the device 30 to connect to another SRWC device, such as the vehicle electronics module 100, the vehicle electronics module 200, and/or the BLE-lockbox 300 (FIG. 4). Additionally, in some embodiments, the wireless communications device may contain a cellular chipset 34 thereby allowing the device to communicate via one or more cellular protocols, such as those used by cellular carrier system 70. In such a case, the wireless communications device becomes user equipment (UE) usable in carrying out cellular communications via cellular carrier system 70.

Wireless communications device 30 may enable vehicle 12 to be in communication with one or more remote networks (e.g., one or more networks at remote facility 80 or computers 78) via packet-switched data communication. This packet-switched data communication may be carried out through use of a non-vehicle wireless access point that is connected to a land network via a router or modem. When used for packet-switched data communication such as TCP/

IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30. Communications device 30 may, via cellular chipset 34, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. For instance, processor 36 can execute programs or process data to carry out at least a part of the method discussed herein. Memory 38 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein.

The wireless communications device 30 can interface various VSMs of the vehicle 12 with one or more devices external to the vehicle 12, such as one or more networks or systems at remote facility 80. This enables the vehicle to communicate data or information with remote systems, such as remote facility 80. Additionally, the wireless communications device 30 can enable the vehicle to be remotely configured by a remote facility or server. For example, the wireless communications device 30 can receive a remote vehicle disable block (VDB) command from the remote facility 80 (or other remote facility or server). The wireless communications device 30 can then verify and/or authenticate this remote VDB command and, thereafter, can set or clear the VDB in accordance with the VDB command. The VDB command can be a VDB set command that causes the VDB to be set so that the vehicle's primary propulsion system is disabled. Thus, a user with a key or keyfob would be prevented from starting the vehicle. Also, the VDB command can be a VDB clear command that causes the VDB to be cleared so that the vehicle's primary propulsion system is enabled (or re-enabled).

Vehicle electronics 20 also includes a number of vehicle-user interfaces that provide vehicle occupants with a means of providing and/or receiving information, including visual display 50, pushbutton(s) 52, microphone 54, and audio system 56. As used herein, the term "vehicle-user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, and/or control input. Audio system 56 provides audio output to a vehicle occupant and can be a dedicated, stand-alone system or part of the primary vehicle audio system. According to one embodiment, audio system 56 is operatively coupled to both vehicle bus 40 and an entertainment bus (not shown) and can provide AM, FM and satellite radio, CD, DVD and other multimedia functionality. This functionality can be provided in conjunction with or independent of an infotainment module. Microphone 54 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 50 is preferably a graphics display and can be used to provide a multitude of input and output functions. Display 50 can be a touch screen on the instrument panel, a heads-up display reflected off of the windshield, or a projector that can project graphics for viewing by a vehicle occupant. Various other vehicle-user interfaces can also be utilized, as the interfaces of FIG. 1 are only an example of one particular implementation.

The second PEPS-vehicle 14 is depicted in the illustrated embodiment as a passenger car, but it should be appreciated that any other vehicle including motorcycles, trucks, sports utility vehicles (SUVs), recreational vehicles (RVs), marine vessels, aircraft including unmanned aerial vehicles (UAVs), etc., can also be used. Moreover, while the vehicle electronics of the vehicle 14 is not shown, the vehicle 14 can include any one or more VSMs discussed herein, including any or all of those VSMs of the vehicle 12, except that vehicle 14 includes vehicle electronics module 200 (FIG. 3) instead of the vehicle electronics module 100. However, in some embodiments, it may be possible for the vehicle 14 to include both the vehicle electronics module 100 and the vehicle electronics module 200.

The non-PEPS-vehicle 16 is depicted in the illustrated embodiment as a passenger car, but it should be appreciated that any other vehicle including motorcycles, trucks, sports utility vehicles (SUVs), recreational vehicles (RVs), marine vessels, aircraft including unmanned aerial vehicles (UAVs), etc., can also be used. Moreover, while the vehicle electronics of the vehicle 16 is not shown, the vehicle 16 can include any one or more VSMs discussed herein, including any or all of those VSMs of the vehicle 12, except for the PEPS module 44. Additionally, the non-PEPS vehicle 16 can include a SRWC-lockbox, such as the BLE-lockbox depicted in FIG. 4. The SRWC-lockbox, which is described in more detail below, can include a compartment for storing a vehicle key for the vehicle 16 and that can be unlocked and/or locked through use of SRWC signals. In some embodiments, the non-PEPS vehicle 16 includes the vehicle electronics module 100. In other embodiments, the non-PEPS vehicle 16 can include the vehicle electronics module 200.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicles 12, 14, and/or 16). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with a vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12, 14 and/or 16 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80 (or vehicle backend services server system 110, as discussed below). For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), networks providing broadband wireless access (BWA), or any combination thereof.

The computers 78 (only one shown in FIG. 1) can be used for one or more purposes, such as for providing peer-to-peer (P2P) vehicle sharing services to a plurality of vehicles and other electronic network computing devices, including vehicles 12, 14, and/or vehicle 16. The computers 78 can be some of a number of computers accessible via a private or public network such as the Internet. Other such accessible computers 78 can be, for example: a service center computer where diagnostic information and other vehicle data can be uploaded from the vehicle; a client computer used by the vehicle owner or other subscriber for various purposes, such as accessing and/or receiving vehicle sensor data (or other data), as well as setting up and/or configuring subscriber preferences or controlling vehicle functions; or a vehicle sharing server which coordinates registrations from a plurality of users who request to use a vehicle as part of a car sharing service. A computer 78 can also be used for providing Internet connectivity such as DNS services or as a network address server that uses DHCP or other suitable protocol to assign an IP address to vehicles 12, 14, and/or 16.

Vehicle backend services facility 80 is a remote facility, meaning that it is located at a physical location that is located remotely from vehicles 12, 14, and/or 16. The vehicle backend services facility 80 (or "remote facility 80" for short) may be designed to provide the vehicle electronics 20 with a number of different system back-end functions through use of one or more electronic servers 82. The vehicle backend services facility 80 includes vehicle backend services servers 82 and databases 84, which may be stored on a plurality of memory devices. Also, remote facility 80 can include one or more switches, one or more live advisors, and/or an automated voice response system (VRS), all of which are known in the art. Vehicle backend services facility 80 may include any or all of these various components and, preferably, each of the various components are coupled to one another via a wired or wireless local area network. Remote facility 80 may receive and transmit data via a modem connected to land network 76. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

Servers 82 can be computers or other computing devices that include at least one processor and memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally-stored instructions, such as software or firmware, which enable the servers 82 to provide a wide variety of services. For network communications (e.g., intra-network communications, inter-network communications including Internet connections), the servers can include one or more network interface cards (NICs) (including, for example, wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Remote facility 80 can include a number of routers, modems, switches, or other network devices that can be used to provide networking capabilities, such as connecting with land network 76 and/or cellular carrier system 70.

Databases 84 can be stored on a plurality of memory, such as a powered temporary memory or any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. One or more databases at the backend facility 80 can store various information and can include a vehicle reservation database and other vehicle backend information database(s). The vehicle reservation database can store reservation information for use in carrying out a reservation of a P2P vehicle.

In some embodiments, the remote facility 80 can use the information stored in databases 84 to carry out one or more embodiments of the reservation establishment process (e.g., the method 500 (FIG. 5)) discussed herein. As mentioned above, although only a single vehicle backend services facility 80 is illustrated, numerous vehicle backend services facilities can be used and, in such a case, the functionality of the numerous vehicle backend services facilities can be coordinated so that the vehicle backend services facilities can act as a single backend network or so that the operation of each facility is coordinated with the operation of the other facilities. And, the servers 82 can be used to provide information stored in the databases 84 to various other systems or devices, such as vehicles 12, 14, and/or 16.

The personal short-range wireless communication (SRWC) device 90 is a mobile devices and may include: hardware, software, and/or firmware enabling SRWC as well as other personal (or mobile) device applications. In one embodiment, the personal SRWC device 90 can include a vehicle-device application 92 and a global navigation satellite system (GNSS) receiver. According to various embodiments, the personal SRWC device can include Android™, iOS™, Windows™ Phone, Windows™ Mobile, BlackBerry™ Tizen™, and/or other various operating systems. In one particular embodiment, the personal SRWC device can be a personal cellular SRWC device that includes a cellular chipset and/or cellular connectivity capabilities, as well as SRWC capabilities. Using a cellular chipset, for example, the personal SRWC device can connect with various remote devices, including computers 78 and remote server facility 80, via wireless carrier system 70. As used herein, a personal SRWC device is a mobile device that is capable of SRWC, that is portable by a user, and where the portability of the device is at least partly dependent on the user, such as a wearable device (e.g., a smartwatch), an implantable device, or a handheld device (e.g., a smartphone, a tablet, a laptop). As used herein, a short-range wireless communications (SRWC) device is a device capable of SRWC. The hardware of SRWC mobile device 90 may comprise: a processor and memory (e.g., non-transitory computer readable medium configured to operate with the processor) for storing the software, firmware, etc. The personal SRWC device's processor and memory may enable various software applications, which may be preinstalled or installed by the user (or manufacturer) (e.g., having a software application or graphical user interface (GUI)).

As mentioned, the personal SRWC device 90 can include a processor and memory. The processor (or processing device) can be any type of device capable of processing electronic instructions including microprocessors, microcontrollers, host processors, controllers, and application specific integrated circuits (ASICs). The processor of the personal SRWC device 90 executes various types of digitally-stored instructions, such as software or firmware programs stored in memory of the personal SRWC device, which enable the device 90 to provide a wide variety of services. The memory of the personal SRWC device may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. In one embodiment, the personal SRWC device 90 can be used to determine a location of the personal SRWC device. Such devices may communicate with wireless communications device 30 or with each other according to one or more SRWC technologies or wired connections, such as a connection using a Universal Serial Bus (USB) cable. In one embodiment, the personal SRWC device 90 can be used to authenticate and/or authorize a user for access to the vehicles 12, 14, and/or 16 as a part of an established reservation.

For example, a user (e.g., P2P vehicle renter) of the personal SRWC device 90 can use the vehicle-device application 92 to configure and establish a reservation of a vehicle, such as vehicle 12, 14, and/or 16. This establishment process can include using a user interface (such as a touchscreen and/or pushbuttons) of the personal SRWC device 90 and then sending this inputted information to the remote facility 80. The remote facility 80 can then access one or more databases, such as the vehicle reservation database, so that information can be obtained informing the remote facility 80 to either confirm or deny the reservation. The remote facility 80 can carry out subsequent communications with the personal SRWC device 90 and can then communicate the confirmation or denial of the reservation to the personal SRWC device 90. When the reservation is confirmed, the remote facility 80 can then send reservation information, such as reservation authentication and/or authorization information, to the personal SRWC device 90. At least some of this reservation information can then be presented by the personal SRWC device 90 to the vehicle electronics module 100 (or 200, or SRWC-lockbox 300) when the user with the personal SRWC device 90 approaches the vehicle 12.

Figure 2:
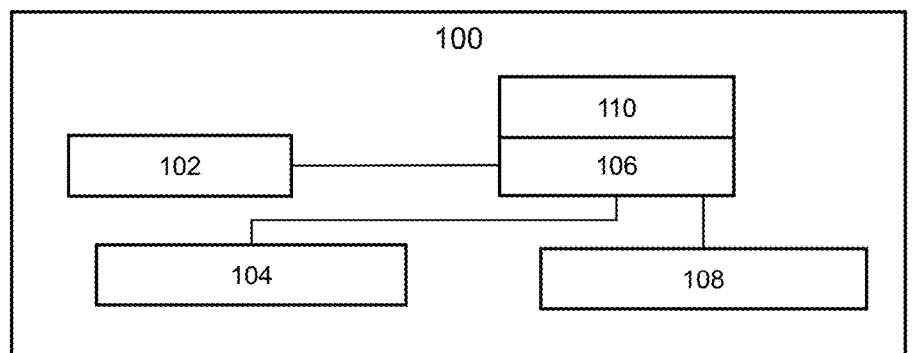
FIG. 2 is a block diagram depicting an embodiment of a vehicle electronics module.

With reference to FIG. 2, there is shown an embodiment of the vehicle electronics module 100, which can be used with the first PEPS-vehicle 12. The vehicle electronics module 100 includes a short-range wireless communication circuit 102, an on-board diagnostics II (OBD II) connector 104, a microcontroller 106, light emitting diode (LED) indicators 108, and memory 110. The vehicle electronics module 100 can also include a housing 112 that houses or contains all of the components 102-110. The housing 112 can be separate from any vehicle housing and can include an exposed portion that enables the OBD II connector 104 to be exposed so that the OBD II connector 104 can be connected to the OBD II port 42 of the vehicle 12, as discussed below. At least in some embodiments, the vehicle electronics module 100 can be connected physically to the vehicle electronics 20 solely through the OBD II connector 104 and can be portable. Moreover, the particular components 102-110 of the vehicle electronics module 100 can be arranged so that the LED indicators 108 can be viewed by a vehicle operator while the OBD II connector 104 of the vehicle electronics module 100 is engaged with the OBD II port 42 of the vehicle electronics 20. In one embodiment, the vehicle electronics module 100 can include a printed circuit board (PCB) that includes the components 102-110 attached thereto and that can be used as a medium for connecting the various components 102-110. In at least some embodiments, the vehicle electronics module 100 is an aftermarket device (i.e., a device that is not considered a part of the original OEM vehicle electronics) that is sent to or otherwise obtained by a P2P manager after the P2P manager applies to use a vehicle as a part of the P2P vehicle sharing network. Thus, at least in these embodiments, the vehicle electronics module 100 is not part of the original OEM vehicle electronics and, thus, not required for normal operation of the vehicle by a user. Moreover, in some embodiments, the vehicle electronics module 100 can include its own housing and can only physically interface with the vehicle electronics via the OBD II connection.

The short-range wireless communication (SRWC) circuit 102 can be configured to communicate wirelessly according to one or more short-range wireless communications (SRWC) such as any of the Wi-Fi™, WiMAX™, Wi-Fi Direct™, other IEEE 802.11 protocols, ZigBee™, Bluetooth™, Bluetooth™ Low Energy (BLE), or near field communication (NFC). The short-range wireless communication (SRWC) circuit 32 enables the vehicle electronics module 100 to transmit and receive SRWC signals, such as BLE signals. The SRWC circuit may allow vehicle electronics module 100 to connect to another SRWC device, such as the wireless communications device 30 and/or the personal SRWC device 90, another vehicle electronics module (e.g., vehicle electronics module 200 (FIG. 3)), and/or the SRWC-lockbox 300 (FIG. 4).

In one embodiment, the SRWC circuit 102 can be used to periodically transmit an advertisement message that is to be received by the personal SRWC device 90. The advertisement can include a reservation identifier, vehicle identification information, and/or a personal SRWC device identification information, as discussed more below. For example, the advertisement can include a vehicle identification number (VIN), an International Mobile Equipment Identity (IMEI), a reservation identifier, or other identifying information that particularly identifies the vehicle 12 or the vehicle electronics module 100. The personal SRWC device 90 can receive this advertisement message, which can be sent using BLE, and, in response, the personal SRWC device 90 can send a response message and/or carry out a handshake with the vehicle electronics module 100. Various authentication techniques can be used, including out-of-band BLE authentication and/or pairing techniques. After the personal SRWC device 90 and the vehicle electronics module 100 create a secure connection, the personal SRWC device 90 can wirelessly transmit reservation information (e.g., reservation authentication information, reservation authorization information) to the vehicle electronics module 100, which can then verify the information with reservation information pre-stored thereon in memory 110 (or received in response to establishing a reservation, as discussed below). Once this information is verified, the vehicle electronics module can then send a door unlock command to the BCM 24 (or other VSM) thereby causing at least one vehicle door to unlock.

Additionally, or alternatively, the SRWC circuit 102 can be used by the vehicle electronics module 100 to communicate with the wireless communications device 30. Although the vehicle electronics module 100 is connected to the vehicle communications bus 40 (and, thus, many VSMs), there may be instances in which it is desirable to communicate with VSMs, such as the wireless communications device 30, using wireless communications. In such instances, a SRWC connection can be established between the vehicle electronics module 100 and the wireless communications device 30 using their respective SRWC circuits 102 and 32.

The OBD II connector 104 is a connector that is complementary to the OBD II port 42 of the vehicle electronics 20. The OBD II connector 104 is connectable to the OBD II port 42 so that information can be communicated between various VSMs of the vehicle electronics 20 and the vehicle electronics module 100. The OBD II connector 104 can be configured according to the SAE J1962 specifications and can be a male connector that includes a plurality of pins that are arranged to interlock with those female pin slots of the OBD II port 42. The OBD II connector 104 can thus be a type A or type B connector according to the SAE J1962 specifications such that the type of the OBD II connector 104 corresponds with that of the OBD II port 42. In other embodiments, any suitable OBD connector and vehicle port may be used, it being understood that the use of OBD II is but one possible embodiment.

When the vehicle electronics module 100 is coupled to the OBD II port 42 via the OBD II connector 104, electrical power can be supplied from the vehicle battery to the vehicle electronics module 100 and, in this way, the OBD II acts as a power supply for the vehicle electronics module 100. Moreover, in many embodiments, the vehicle 12 can be configured to provide power to the OBD II port 42 at times when the vehicle is powered on and at times when the powered off. In this way, as long as the vehicle battery is not "dead" (or below a suitable voltage or charge threshold), the OBD II port 42 can provide power to the vehicle electronics module 100.

In at least some embodiments, the OBD II port 42 can be used to communicate information between the vehicle electronics module 100 and one or more VSMs of the vehicle electronics 20. For example, as mentioned above, the vehicle electronics module 100 can set a vehicle disable block (VDB) via sending a local VDB message to the BCM 24 (or other vehicle system module) using the OBD II connection (i.e., the connection between the OBD II connector 104 and the OBD II port 42). As another example, the wireless communications device 30 can send reservation information (e.g., reservation information that has been received at the device 30 from the remote facility 80) to the vehicle electronics module 100. The reservation information can include reservation authorization information (e.g., an IMEI of the personal SRWC device that is authorized to access the vehicle during the reservation), reservation authentication information (e.g., information that can be used to authenticate the personal SRWC device 90), identifiers (e.g., personal SRWC device identification information, a reservation identifier, vehicle identification information), reservation parameters (e.g., start and end time, access capabilities and/or limits), as well as various other information. The vehicle electronics module 100 can then use this information when establishing a SRWC connection, such as a BLE connection, with the personal SRWC device 90. Additionally, this reservation information (e.g., start and end times, authorization information, authentication information) can be used to set the vehicle disable block (VDB). In other embodiments, a different hardwired-vehicle bus connector can be used that enables the vehicle electronics module 100 to be communicatively coupled via a hardwire connection to the vehicle electronics. In such instances, the vehicle electronics module 100 can be connected to this different hardwired-vehicle bus connector instead of the OBD II port.

The microcontroller 106 can be any type of device capable of processing electronic instructions including microprocessors, microcontrollers, host processors, controllers, vehicle communication processors, and application specific integrated circuits (ASICs). The microcontroller 106 executes various types of digitally-stored instructions, such as software or firmware programs stored in memory 110, which enable the vehicle electronics module 100 to provide a wide variety of services. For instance, microcontroller 106 can execute programs or process data to carry out at least a part of the method discussed herein (e.g., method 600 (FIG. 6)). The memory 110 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein.

The light emitting diode (LED) indicators 108 can be LEDs that are controlled by the microcontroller 106 for purposes of communicating information to a user or operator. For example, the LED indicators 108 can emit lights according to various preconfigured patterns or sequences, and through use of various colors, to inform the user or operator of a status of the vehicle electronics module 100, the reservation, and/or the vehicle 12. Those skilled in the art will appreciate that other light indicators or displays (as well as other user device interfaces) can be used either alternatively or additionally.

With reference to FIG. 3, there is shown a second embodiment of a vehicle electronics module 200 that can be used, for example, with the second PEPS-vehicle 14. The vehicle electronics module 200 is depicted as including a short-range wireless communications (SRWC) circuit 202, a power supply 204, a microcontroller 206, LED indicators 108, memory 210, battery 212, keyfob circuit 214, and global navigation satellite system (GNSS) receiver 216. The vehicle electronics module 200 can also include a housing 218 that houses or contains all of the components 202-216. The housing 218 can be separate from any vehicle housing and can include an exposed portion that enables a connector of the power supply 204 to be exposed so that the power supply 204 can be connected to the auxiliary power port 48 of the vehicle 14, as discussed below. At least in some embodiments, the vehicle electronics module 200 can be connected physically to the vehicle electronics 20 solely through the power supply 204 and can be portable. Moreover, the particular components 202-116 of the vehicle electronics module 200 can be arranged so that the LED indicators 208 can be viewed by a vehicle operator while the power supply 204 of the vehicle electronics module 200 is engaged with the auxiliary power port 48 of the vehicle electronics 20. In one embodiment, the vehicle electronics module 100 can include a printed circuit board (PCB) that includes the components 202-216 attached thereto and that can be used as a medium for connecting the various components 202-216. In at least some embodiments, the vehicle electronics module 200 is an aftermarket device that is sent to or otherwise obtained by a P2P manager after the P2P manager applies to use a vehicle as a part of the P2P vehicle sharing network. Thus, at least in these embodiments, the vehicle electronics module 200 is not part of the original OEM vehicle electronics. Moreover, in some embodiments, the vehicle electronics module 200 can include its own housing and can only physically interface with the vehicle electronics via the auxiliary power port 48.

The SRWC circuit 202 can be similar or the same as the SRWC circuit 102 of the vehicle electronics module 100. For example, the SRWC circuit 202 can be used to carry out Bluetooth™ Low Energy (BLE) communications with the wireless communications device 30 and/or the personal SRWC device 90. And, in some embodiments, the SRWC circuit 202 can be used to carry out SRWC communications with the vehicle electronics module 100. In many embodiments, the SRWC circuit 202 can be used as a primary means of communication with the vehicle 14 since, in many scenarios, the vehicle electronics module 200 does not include a hardwired connection to the vehicle electronics 20. For example, as mentioned above, the vehicle electronics module 100 can carry out communications with the vehicle via the OBD II port 42, which is connected to the communications bus 40 of the vehicle electronics 20. However, in many embodiments, the vehicle electronics module 200 does not include an OBD II connector 104. And, although the vehicle electronics module 200 can be connected to the vehicle 200 via a Universal Serial Bus (USB) connection (discussed below), the vehicle 14 may restrict use of this USB connection, as discussed below. Thus, the vehicle electronics module 200 can use SRWC communications, such as BLE communications, for sending information to, and receiving information from, the vehicle electronics 20. In other embodiments, the vehicle 14 (or vehicle 12) can include both the vehicle electronics module 100 and the vehicle electronics module 200. In these embodiments, the vehicle electronics module 200 can communicate with the vehicle via the vehicle electronics module 100.

In some embodiments, the SRWC circuit 202 can be used to send an advertisement in the same or similar way as the SRWC circuit 102 can. The personal SRWC device 90 and the vehicle electronics module 200 can thus establish a SRWC connection in a similar fashion to that discussed above with respect to the SRWC connection between the personal SRWC device 90 and the vehicle electronics module 100. In this way, once a secure connection is established, reservation authorization and/or authentication information can be communicated from the personal SRWC device 90 to the vehicle electronics module 200, which can then verify or otherwise authenticate this information. Other reservation information can be transmitted as well. In response to a successful verification, the vehicle electronics module 200 can then power the keyfob circuit 214 to unlock the vehicle doors.

Moreover, reservation information can be communicated from the remote facility 80 to the wireless communications device 30, and then from the wireless communications device 30 to the vehicle electronics module 200 via a SRWC connection. The vehicle electronics module 200 and the wireless communications device 30 can establish a secured SRWC connection using pre-stored keys (or other authorization/authentication information), or may use other suitable pairing or connection establishment processes. This SRWC connection between the wireless communications device 30 and the vehicle electronics module 200 can also be used to communicate reservation status information from the vehicle electronics module 200 to the vehicle electronics 20. For example, once the personal SRWC device 90 has been authenticated and/or verified, the vehicle electronics module 200 can communicate the result of this authentication and/or verification to the wireless communications device 30, which can then clear the vehicle disable block (VDB). In such an instance, the vehicle electronics module 200 can send authentication information (e.g., a certificate) to the wireless communications device 30 (and, finally, from the wireless communications device 30 to the BCM 24) that can be used to better ensure that the vehicle electronics module 200 is entitled to issue the VDB clear command. In other embodiments, the vehicle electronics module 200 may not be entitled to clear the VDB of the vehicle 14.

The power supply 204 can include a power supply connector and a power supply regulator. The power supply regulator can be used to regulate the amount of voltage, wattage, and/or current that is pulled into the vehicle electronics module 200. In one embodiment, the power supply regulator can be a low-dropout regulator, such as a direct-current (DC) linear voltage regulator. The power supply connector can be a hardwired connector that can be complementary to the auxiliary power port 48 of the vehicle electronics 20. In one example, the power supply connector can be a male Universal Serial Bus (USB) connector that can be plugged in (or otherwise coupled to) the auxiliary power port 48, which, in this case, may be a female USB port. Various USB types can be used, including USB type A, type B, micro-B, mini-B, and/or type C. These USB connectors may also be USB 2.0 or 3.0 connectors. Also, other power supply connectors can be used, such as a cigarette lighter socket connector, a coaxial DC input, a Deutsches Institut für Normung (DIN) connector, etc. The power supply 204 can receive electrical charge from the vehicle battery via the auxiliary power port 48. In many embodiments, this electrical charge that is supplied via the auxiliary power port 48 can be the primary power source that the vehicle electronics module 200 uses to power its components (e.g., components 202, 206-216). In some embodiments, the vehicle electronics module 200 may only be supplied electrical charge (or power) when the vehicle is in a powered on mode (e.g., the vehicle is started, the vehicle is in an accessory (ACC) mode). The electrical charge provided by the auxiliary power port 48 can also be used to charge (or re-charge) the battery 212, which can be used as a backup battery for times when the vehicle is not in a powered on state or otherwise receiving power via the auxiliary power port 48.

In instances where the vehicle 14 includes an auxiliary power port 48 that can typically be used for data communications (e.g., a USB connector), the vehicle 14 may restrict use of this connection to media or entertainment purposes. Or, in other embodiments, the connection (e.g., the USB connection) may solely be restricted to providing electrical charge from the vehicle battery. And, in yet another embodiment, the vehicle 14 may disallow or filter communications from the vehicle electronics module 200 (or other device connected to the auxiliary power port 48) that are communicated using the USB connection. Thus, in such embodiments where the communications over the auxiliary power port 48 are restricted, the vehicle electronics module 200 can use the SRWC circuit 202 for communications with the vehicle 14. Also, in embodiments where the communications over the auxiliary power port 48 are possible, the vehicle electronics module 200 may still use the SRWC circuit 202, although use of the auxiliary power port 48 for data communications may be used as well.

The microcontroller 206 can be similar or the same as the microcontroller 106 of the vehicle electronics module 100. For example, the microcontroller 206 can be comprised of (or include) any of those processors discussed above with respect to the microcontroller 106 of the vehicle electronics module 100. Moreover, the memory 210 can be similar or the same as the memory 110 of the vehicle electronics module 100. For example, the memory 210 can be comprised of (or include) any of those memory types discussed above with respect to the memory 110 of the vehicle electronics module 100. Also, the LED indicators 208 can be similar or the same as the LED indicators 108 of the vehicle electronics module 100.

The battery 212 can be any suitable battery that can be used to power the vehicle electronics module 200 when power is not being supplied via the power supply 204. In one embodiment, the battery 212 can be a lithium-ion (Li-ion) battery pack and, in a particular embodiment, the battery 212 can be a Li-ion battery pack having 2,000 mAh (milliampere hour). For example, in some embodiments, when the vehicle 14 is in an "off" state, the auxiliary power port 48 does not supply electrical charge to the vehicle electronics module 200. However, the vehicle electronics module 200 may need electrical power to carry out certain operations, such as for transmitting an advertisement using the SRWC circuit 202. In many scenarios, a user may reserve the vehicle 14, but the vehicle 14 may be locked and in a powered off state such that no power is being supplied to the vehicle electronics module 200. Thus, the backup battery 212 can supply power while the vehicle is in the powered off state so that the SRWC circuit can communicate with the personal SRWC device 90, as well as power the keyfob circuit 214 to permit the user to enter the vehicle.

The keyfob circuit 214 can be a circuit that is typically used in a keyfob for use with the PEPS module 44 of the vehicle 14. The keyfob circuit 214 can include a radio frequency (RF) transmitter that can transmit high-frequency radio signals in response to receiving a low-frequency radio signal from the PEPS module 44. Those skilled in the art will appreciate that other frequencies can be used as well. When the PEPS module 44 receives the response from the vehicle key (and the response is verified), the PEPS module 44 can unlock the vehicle doors, enable the vehicle for starting the primary propulsion system, and/or otherwise provide access to the vehicle. The keyfob circuit 214 can be provided power from the power supply 204 or the battery 212 when the microcontroller 206 (or the vehicle electronics module 200) determines that the personal SRWC device 90 is authenticated and/or authorized. Moreover, the vehicle electronics module 200 can determine whether a reservation period is currently ongoing for a user associated with the personal SRWC device 90 and, if so, the vehicle electronics module 200 can provide power to the keyfob circuit 214.

Global navigation satellite system (GNSS) receiver 216 receives radio signals from a constellation of GNSS satellites 60. The GNSS receiver 216 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 216 may be a GPS receiver, which may receive GPS signals from a constellation of GPS satellites 60. And, in another example, GNSS receiver 216 can be a BDS receiver that receives a plurality of GNSS (or BDS) signals from a constellation of GNSS (or BDS) satellites 60. In either implementation, GNSS receiver 216 can include at least one processor and memory, including a non-transitory computer readable memory storing instructions (software) that are accessible by the processor for carrying out the processing performed by the receiver 216.

Additionally, the GNSS receiver 216 can be used by the vehicle electronics module 200 to synchronize a clock included in the vehicle electronics module 200. The GNSS receiver 216 can use GNSS signals received from the constellation of GNSS satellites 60 to obtain accurate time information and, thus, use this information to keep the clock of the vehicle electronics module 200 synchronized. As mentioned above, the vehicle electronics module 200 can provide power to the keyfob circuit 214 (which can be used to gain access to the vehicle) during an ongoing reservation period. Thus, in at least some scenarios, it can be useful to synchronize the clock of the vehicle electronics module 200 so that access is not granted at times outside the actual reservation period(s).

With reference to FIG. 4, there is shown a short-range wireless communication (SRWC) lockbox 300 that is located within the non-PEPS-vehicle 16. The SRWC-lockbox 300 includes a SRWC circuit 302, a lock 304, a microcontroller 306, light emitting diode (LED) indicators 308, memory 310, and a compartment 312. A physical vehicle key 17 can be stored within the compartment 312 of the SRWC-lockbox 300. The physical vehicle key 17 is a key that is used to start the vehicle 16, and can also be used to unlock or lock the vehicle 16. In some embodiments, the physical key can be a non-passive physical key, or may be a passive physical key, such as a keyfob. The SRWC-lockbox 300 can be used to protect the physical vehicle key 17 from theft. The SRWC-lockbox 300 can include a housing that houses the components of the SRWC-lockbox 300. The SRWC-lockbox 300 can be secured to the vehicle 16 to prevent the SRWC-lockbox 300 from being removed from the interior cabin of the vehicle.

The SRWC circuit 302 can be similar or the same as the SRWC circuit 102 of the vehicle electronics module 100. For example, the SRWC circuit 302 can be used to carry out Bluetooth™ Low Energy (BLE) communications with the wireless communications device 30 and/or the personal SRWC device 90. The SRWC circuit 302 can transmit an advertisement, which can then be received by the personal SRWC device 90. The personal SRWC device 90 and the SRWC-lockbox 300 can then establish a secure connection, such as those discussed above with respect to the SRWC circuit 102 of the vehicle electronics module 100. Then, information (e.g., a code or other secret data) can be shared over this established connection, which can be a BLE connection. The microcontroller 306 can be similar or the same as the microcontroller 106 of the vehicle electronics module 100. For example, the microcontroller 306 can be implemented using any of the types of processors discussed above with respect to the microcontroller 106 of the vehicle electronics module 100. Moreover, the memory 310 can be similar or the same as the memory 110 of the vehicle electronics module 100. For example, the memory 310 implemented using any of those memory types discussed above with respect to the memory 110 of the vehicle electronics module 100. Also, the LED indicators 308 can be similar or the same type as the LED indicators 108 of the vehicle electronics module 100.

The compartment 312 can be any compartment that includes a point of access (e.g., a door) that can be locked or otherwise secured such that the contents of the compartment 312 (e.g., the vehicle key 17) cannot be accessed. In one embodiment, the compartment 312 includes a top wall, a bottom wall, three side walls, and a door that can be locked by the lock 304. Of course, other configurations are possible.

The lock 304 is an electronically-controllable lock that can be used to provide or restrict access to the compartment. The lock 304 can be controlled (e.g., unlocked, locked) by the microcontroller 306. For example, the microcontroller 306 can receive an unlock request from the personal SRWC 90 and, upon receipt of this request, the microcontroller 306 can compare information in the unlock request with stored information in the memory 310. This information in the unlock request can be a code or other secret data. Upon the code (or other secret data) matching a code (or other secret data) stored in memory 310, the microcontroller 306 can send an unlock command to the lock 304 thereby causing the lock 304 to unlock and provide access to the compartment 312. In one embodiment, the secret data sent by the personal SRWC device 90 and that is stored in the memory 310 can be a digital certificate or parts thereof.

The SRWC-lockbox 300 can also include a battery 314, which can be similar in nature to the battery 212 of the vehicle electronics module 200. The battery can be used to provide electrical charge to the electrical components of the SRWC-lockbox 300, including the SRWC circuit 302, the microcontroller 306, memory 310, the lock 304, and the LED indicators 308. Also, in some embodiments, the SRWC-lockbox 300 can include a power supply that can be connected to the auxiliary power port 48 of the vehicle 16, which can be used to provide electrical power or charge to those electrical components of the SRWC-lockbox 300, as well as for recharging the battery 314.

Figure 5:
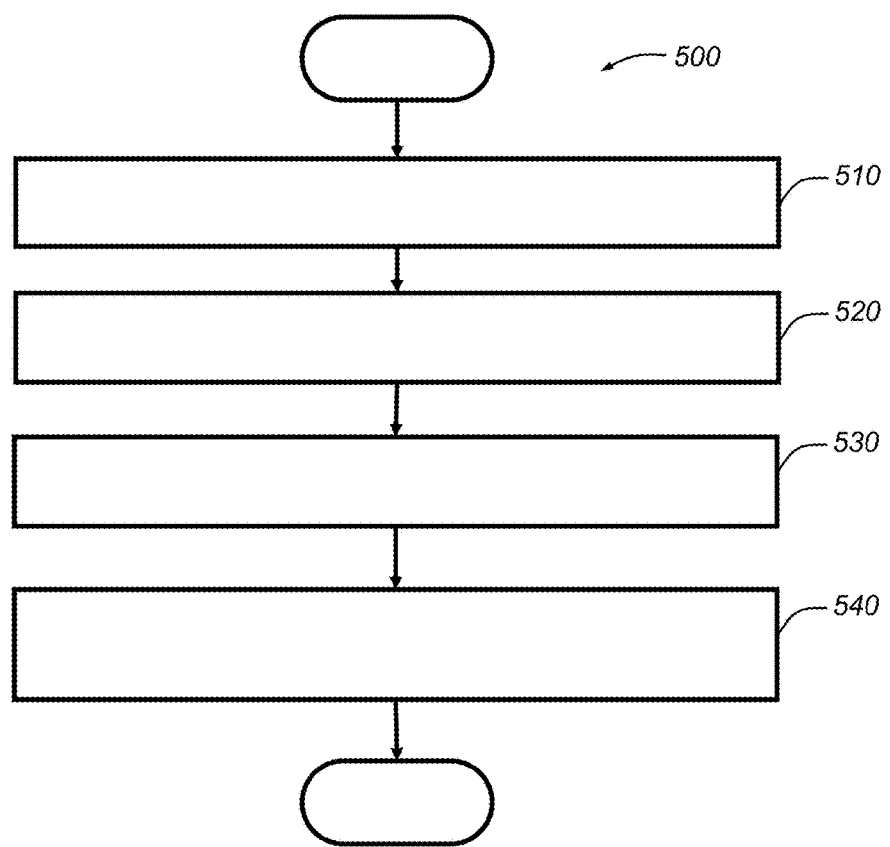
FIG. 5 is a flowchart of an embodiment of a method of establishing a vehicle reservation.

With reference to FIG. 5, there is shown an embodiment of a method 500 of enabling a vehicle to be operated as a part of a vehicle reservation. In one embodiment, the method 500 can be carried out by the remote facility 80. Although the steps of the method 500 are described as being carried out in a particular order, it is hereby contemplated that the steps of the method 500 can be carried out in any suitable or technically feasible order as will be appreciated by those skilled in the art.

In step 510, a vehicle reservation request is received at a remote facility. The vehicle reservation request can include an identifier of a requested vehicle that a user desires to reserve (e.g., a VIN), a start time (and/or date), an end time (and/or date), user information (e.g., user credentials, user authentication information), and various other reservation parameters. A user can configure the reservation request using the personal SRWC device 90 (e.g., using vehicle-device application 92), or may do so using a computer 78. The user can use a graphical user interface (GUI) or other suitable input method. The reservation request can then be submitted to a vehicle backend services facility or other remote facility, which can then process the request. The method 500 continues to step 520.

In step 520, the remote facility determines whether to establish the reservation. The remote facility 80, for example, can recall information from databases 84, such as from the vehicle reservation database, and can determine whether to permit and/or establish the requested reservation. This determination can include checking for the requested vehicle's availability, determining whether the user is qualified to reserve the vehicle, comparing reservation parameters received in the reservation request to information pertaining to the requested vehicle, etc. When the remote facility determines to permit or otherwise establish the reservation, the method 500 continues to step 530. If the reservation is disallowed, the method 500 can end.

In step 530, the remote facility obtains or generates authentication and/or authorization information. The authentication information can be a digital certificate or certain parts of a digital certificate. In other embodiments, the authentication information can be other information suitable to authenticate a vehicle user or device (e.g., the personal SRWC device 90). The authorization information can include certain credential information, keys, or other secret information. In some embodiments, the authentication and authorization information can be aggregated into a single datum or data. The authentication and/or authorization information can be generated in response to determining to establish the reservation. In other embodiments, the authentication and/or authorization information can be pre-generated for a particular vehicle (or P2P user) and, thereafter, can be obtained or recalled from memory or a database, such as from the vehicle reservation database. In at least some embodiments where the authentication and/or authorization information is pre-generated for a particular vehicle (or P2P user), this information may only be sent to the personal SRWC device 90 (step 540).

Also, other reservation information can be obtained or generated. This information can include information concerning the reserved vehicle, information pertaining to the P2P user, and/or information pertaining to a device of the P2P user (e.g., the P2P vehicle renter), such as the personal SRWC device 90. For example, the reservation information can include authentication information, authorization information, a reservation identifier, vehicle identification information, and/or a personal SRWC device identification information. The reservation identifier can be a unique identifier that is used to uniquely identify the present reservation from other reservation. In other embodiments, the reservation identifier can be unique with respect to other reservation identifiers for a particular vehicle or vehicle electronics module and, in this sense, the combination of a vehicle identification information and the reservation identifier can uniquely identify the present reservation. Other combinations of identifiers used to uniquely identify the each reservation of the P2P vehicle sharing network can be used as well. The vehicle identification information can include a vehicle identification number, a Bluetooth™ address (BD ADDR) (e.g., a BD ADDR of the SRWC circuit 102 or 32), a media access control (MAC) address (e.g., a MAC address of the SRWC circuit 102 or 32), or other identifier that can be used to identify the particular reserved vehicle or the vehicle electronics module 100. The personal SRWC device identification information can be an International Mobile Equipment Identity (IMEI) of the personal SRWC device 90, a phone number of the personal SRWC device 90, a MAC address of the personal SRWC device 90, a BD ADDR of the personal SRWC device 90, or other identifying information of the personal SRWC device 90. The method 500 continues to step 540.

In step 540, the reservation information is sent to the personal SRWC device and/or the vehicle. The reservation information can include the authorization information, the authentication information, vehicle identification information, personal SRWC device identification information, and/or other reservation information (e.g., start and end times of the reservation). In one embodiment, the remote facility 80 can send the authorization information, the authentication information, and the vehicle identification information to the personal SRWC device 90. This information can be sent to the personal SRWC device 90 via the land network 76 and/or the cellular carrier system 70. Also, the remote facility 80 can send the personal SRWC device identification information and other reservation information to the vehicle, such as the reservation time period (e.g., start times and dates, end times and dates). In some embodiments, the vehicle 12 (or the vehicle electronics module) may already include authorization information and/or authentication information; in such embodiments, the remote facility 80 may not need to send this information to the vehicle 12. In other embodiments, however, the remote facility 80 can send the authorization information and/or authentication information, along with the personal SRWC device identification information and other reservation information, to the vehicle 12. The method 500 then ends.

Figure 6:
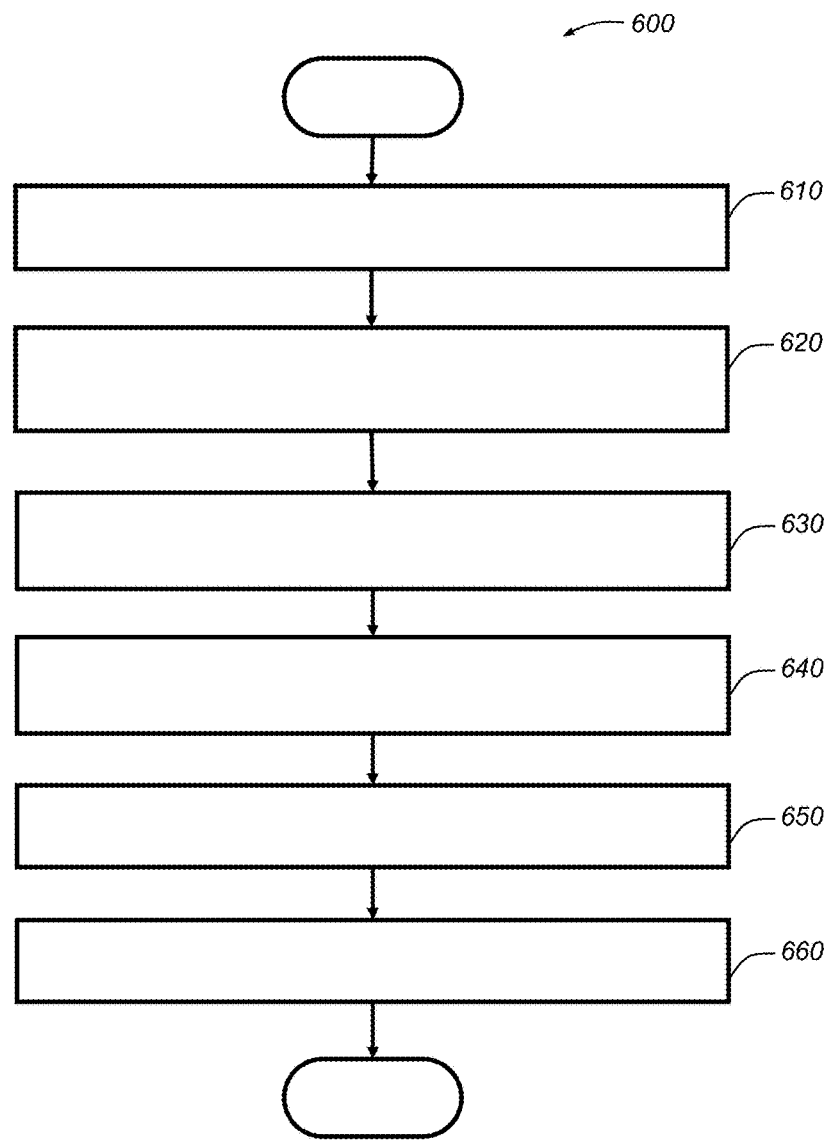
FIG. 6 is a flowchart of an embodiment of a method of enabling a vehicle to be operated as a part of a vehicle reservation.

With reference to FIG. 6, there is shown an embodiment of a method 600 of enabling a vehicle to be operated as a part of a vehicle reservation. In one embodiment, the method 600 can be carried out by the vehicle electronics module 100. Although the steps of the method 600 are described as being carried out in a particular order, it is hereby contemplated that the steps of the method 600 can be carried out in any suitable or technically feasible order as will be appreciated by those skilled in the art.

In many embodiments, the method 600 can begin after the method 500 is carried out or after another vehicle reservation establishment process is carried out. Also, the method 600 can be carried out by the vehicle electronics module 100 that is installed in the PEPS-vehicle 12. As mentioned above, in many embodiments, the vehicle electronics module 100 can be readily installed in the vehicle 12 through plugging the vehicle electronics module 100 into the on-board diagnostics II (OBD II) port 42 of the vehicle 12. Prior to the method 600 and/or prior to the method 500, the vehicle electronics module 100 can carry out a setup process with the vehicle 12, which may include the exchange of information over the OBD II connection. In other embodiments, the vehicle sharing 100 and the vehicle 12 can carry out an initial SRWC connection establishment process or a pairing process in which the vehicle electronics module 100 and the vehicle 12 (specifically, for example, the wireless communications device 30) establish a connection and then store connection information, such as a shared key that can be generated as a part of the initial SRWC connection establishment process or the pairing process. Moreover, as a part of the setup, other information can be shared between the vehicle electronics module 100 and the vehicle 12.

Additionally, the vehicle electronics module 100 can be registered with a vehicle backend services facility, such as remote facility 80. In some embodiments, this registration can be carried out automatically by the vehicle electronics module 100 and the vehicle 12, which can occur as a part of the initial setup. In other embodiments, a vehicle owner or primary operator can register the vehicle electronics module 100 through use of a website, computer application, or other web-portal. This registration process can include the vehicle owner or primary operator inputting information into a user interface. This inputted information can be information pertaining to the vehicle electronics module 100 and/or the P2P vehicle manager, as well as other information. Once the vehicle electronics module 100 has been installed, setup, and/or registered, the vehicle electronics module 100 is ready for use as a part of the peer-to-peer (P2P) vehicle sharing network.

The method 600 begins with step 610, wherein an advertisement is transmitted or broadcasted by a vehicle electronics module. In one embodiment, the vehicle electronics module 100 can use the short-range wireless communication (SRWC) circuit 102 to transmit an advertisement. In one embodiment, the advertisement is a wireless message that is configured according to a particular SRWC protocol or technology, such as Bluetooth™ Low Energy (BLE). In other embodiments, other SRWC protocols can be used, such as Wi-Fi™ and/or Wi-Fi Direct™.

As mentioned above with respect to the method 500, the vehicle 12 and/or the vehicle electronics module 100 can include reservation information that is received as a part of the reservation process. This reservation information can include personal SRWC device identification information, which can be or at least include an identifier of the personal SRWC device 90. Additionally, authorization information and/or authentication information can be provided to the vehicle 12 and/or the vehicle electronics module 100 as a part of the reservation establishment process. However, in other embodiments, the authorization information and/or authentication information may be pre-stored at the vehicle 12 and/or the vehicle electronics module 100. In such a case, the authorization information and/or authentication information may only be sent to the personal SRWC device 90. In at least some embodiments, the advertisement can include at least part of the personal SRWC device identification information and, in a particular embodiment, the advertisement can include an identifier of the personal SRWC device 90; in these cases, the advertisement can be considered a directed advertisement due to the fact that the advertisement indicates a particular personal SRWC device 90 that it desires to connect with through inclusion of the identifier of the personal SRWC device 90 (or other personal SRWC device identification information) within the advertisement. In other embodiments, the advertisement can be a non-directed advertisement.

The advertisement can also include other reservation information, such as a reservation identifier. This reservation identifier can be generated at the remote facility 80 and then sent to the vehicle 12, the vehicle electronics module 100, and/or the personal SRWC device 90 as a part of the reservation establishment process (e.g., the method 500). Various other information can be included in the advertisement as well. In one embodiment, the advertisement can be transmitted at all times when the vehicle electronics module 100 is powered.

Once the advertisement is transmitted, which can occur periodically at even or random intervals, the personal SRWC device 90 can receive the advertisement. For example, when a P2P user (e.g., the P2P vehicle renter) who holds the personal SRWC device 90 enters a SRWC range or predetermined distance of the vehicle 12 (or the vehicle electronics module 100), the personal SRWC device 90 receives the advertisement. The personal SRWC device 90 can then compare information contained in the advertisement, such as the reservation information (including various identifiers), with stored information. Upon the personal SRWC device 90 determining that the information matches or corresponds to information stored at the personal SRWC device 90, a response can be generated by the personal SRWC device 90 and then transmitted to the vehicle electronics module 100. This message can also include various information, such as vehicle identification information or a reservation identifier. Or, in other embodiments, this information can include personal SRWC device identification information. Additionally, in at least some embodiments, the advertisement and/or response can include a universally unique identifier (UUID), which can include personal SRWC device identification information, vehicle identification information, and/or the reservation identifier. The method 600 then continues to step 620.

In step 620, a response from the personal SRWC device is received. The response can be sent by the SRWC circuit of the personal SRWC device 90 and in response to receiving the advertisement from the vehicle electronics module 100. The response can include personal SRWC device identification information, vehicle identification information, and/or the reservation identifier, as mentioned above. Also, in some embodiments, the response can include other reservation information. In one embodiment, the response can be a scan response that is used for BLE communications in which the responding device requests more information before forming an established connection. Thus, in some embodiments, the personal SRWC device 90 and the vehicle electronics module 100 can carry out subsequent communications after the response is received at the vehicle electronics module 100 and before a connection is established (step 630). The method 600 continues to step 630.

In step 630, a short-range wireless communication (SRWC) connection is established between the personal SRWC device and the vehicle electronics module. The SRWC connection can be established using the SRWC protocol or technology that was used to transmit the advertisement and/or response messages discussed above. For example, a BLE connection can be formed using a BLE pairing process. The BLE pairing process can use any of a number of security mechanisms for the pairing. In one embodiment, an out-of-band pairing process is used in which reservation information (or other information known to the vehicle electronics module 100 or vehicle 12) can be used as a basis for forming a shared secret between the vehicle electronics module 100 and the personal SRWC device 90. And, in some embodiments, the connection establishment process can include a handshake, such as a four-way handshake. Once the connection is established, a shared secret or other security information can be stored at the vehicle electronics module 100 and/or the personal SRWC device 90. Moreover, in some embodiments, the steps 610 and 620 may be considered as a part of the SRWC connection establishment process. The method 600 continues to step 640.

In step 640, an authentication process can be carried out. In many embodiments, the authentication process can be carried out in addition to the connection establishment process, which can contain its own authentication process (e.g., using out-of-band information). And, in many embodiments, the authentication process is carried out over the established SRWC connection. The authentication process can include the personal SRWC device 90 sending authentication information that can be used to authenticate the personal SRWC device 90 to the satisfaction of the vehicle electronics module 100 and/or the vehicle 12. The authentication information can be a digital certificate, a token or a secret unique string, or other security information. Moreover, a challenge and a response scheme can also be used in conjunction with the authentication information to further verify the authenticity of the personal SRWC device 90. The vehicle electronics module 100 can compare the digital certificate (or other authentication information) with a digital certificate (or other authentication information) stored in memory 110 or at a VSM of the vehicle 12. In the latter case, the certificate or parts thereof can be sent over the OBD II connection to one or more VSMs of the vehicle 12 (e.g., the BCM 24, the wireless communications device 30). The vehicle electronics module 100 and/or the vehicle 12 can then verify the information. In the case that the vehicle electronics module 100 verifies the authentication information, the vehicle electronics module 100 can send a notification to the vehicle, such as to one or more VSMs (e.g., BCM 24), that indicates whether the authentication was successful. In the case that the vehicle 12 verifies the authentication information, the vehicle 12 can send a notification to the vehicle electronics module 100 that indicates whether the authentication was successful. Upon unsuccessful verification, the vehicle electronics module 100 can send a message to the personal SRWC device and/or disconnect from the personal SRWC device 90, at which time the method 600 may end. Otherwise, the method 600 continues to step 650.

In step 650, the vehicle doors of the vehicle are unlocked. In many embodiments, this step can be carried out after and/or in response to successful verification of the authentication information (step 640). In one embodiment, the vehicle electronics module 100 can verify the authentication information (step 640) and, after successful verification, the vehicle electronics module 100 can send a door unlock message over the OBD II connection to the body control module (BCM) 24 of the vehicle. The door unlock message can instruct the BCM 24 to unlock at least one vehicle door, such as a driver door. This message can include authentication information, which can be the same or different than the authentication information discussed with respect to step 640. Upon verification of this authentication information, the BCM 24 can send an unlock command to one or more vehicle door lock actuators (or other door lock mechanisms) instructing the vehicle door lock actuators to unlock. In other embodiments, a different vehicle system module (VSM) can be used instead or in conjunction with the BCM 24. The method 600 continues to step 660.

In step 660, the vehicle can be enabled for start. As used herein, "enabled for start" refers to placing the vehicle into a condition or state in which the vehicle is not inhibited from being started by a user with a vehicle key. For example, in a particular embodiment, at the start of method 600, the vehicle can have a vehicle disable block (VDB) set such that the vehicle is prevented from being started even by a user with an authorized and/or authentic vehicle key. As mentioned above, the VDB can be set or cleared (i.e., switched to a non-set state) remotely by a remote facility or locally by the vehicle electronics module 100. Thus, in some embodiments, after (or in response to) successful verification of the authentication information (step 640) and/or after the vehicle doors are unlocked (step 650), the vehicle electronics module 100 can send a VDB clear command to the vehicle 12 that instructs the vehicle 12 to clear the VDB such that the VDB is not set. In one embodiment, this can include sending authentication information from the vehicle electronics module 100 to the BCM 24 in conjunction with a VDB clear command. The BCM 24 can verify the information and, upon successful verification, can clear the VDB thereby enabling the vehicle 12 for start. In other embodiments, a message can be sent to the wireless communications device 30 from the vehicle electronics module 100, which can then send information contained in the message (e.g., authentication information) to a remote facility 80, which can verify the information. In response to the verification at the remote facility, the remote facility 80 can send a remote VDB clear command to the vehicle 12 thereby clearing the VDB and enabling the vehicle 12 for start.

Thus, at this time, the P2P user (e.g., the P2P vehicle renter) can enter the vehicle and start the vehicle via a vehicle start pushbutton. Also, it should be appreciated that the PEPS module 44 (or other VSM) may require the presence and response from a passive vehicle key at the vehicle 12 in order to unlock the vehicle doors and/or start the vehicle. Thus, in such embodiments, a keyfob circuit can be included in the interior cabin of the vehicle and, in some embodiments, the keyfob circuit can be a part of a physical passive key. For example, when an unlock command is sent or when the user presses a vehicle start pushbutton, the PEPS module 44 may transmit a low frequency signal, which can be received at the keyfob circuit and responded to by the keyfob circuit with a high frequency response. This response can then be received by the PEPS module 44, verified at the PEPS module 44, and, when the response is successfully verified, the PEPS module 44 can unlock or start the vehicle. Additionally, in some scenarios, the keyfob circuit can be locked within the vehicle or otherwise secured therein such that the keyfob circuit can be prevented from being removed from the vehicle. In other embodiments, the vehicle 12 can be configured or otherwise operated in a manner that does not require the presence of a keyfob circuit at the vehicle. The method 600 then ends.

Figure 7:
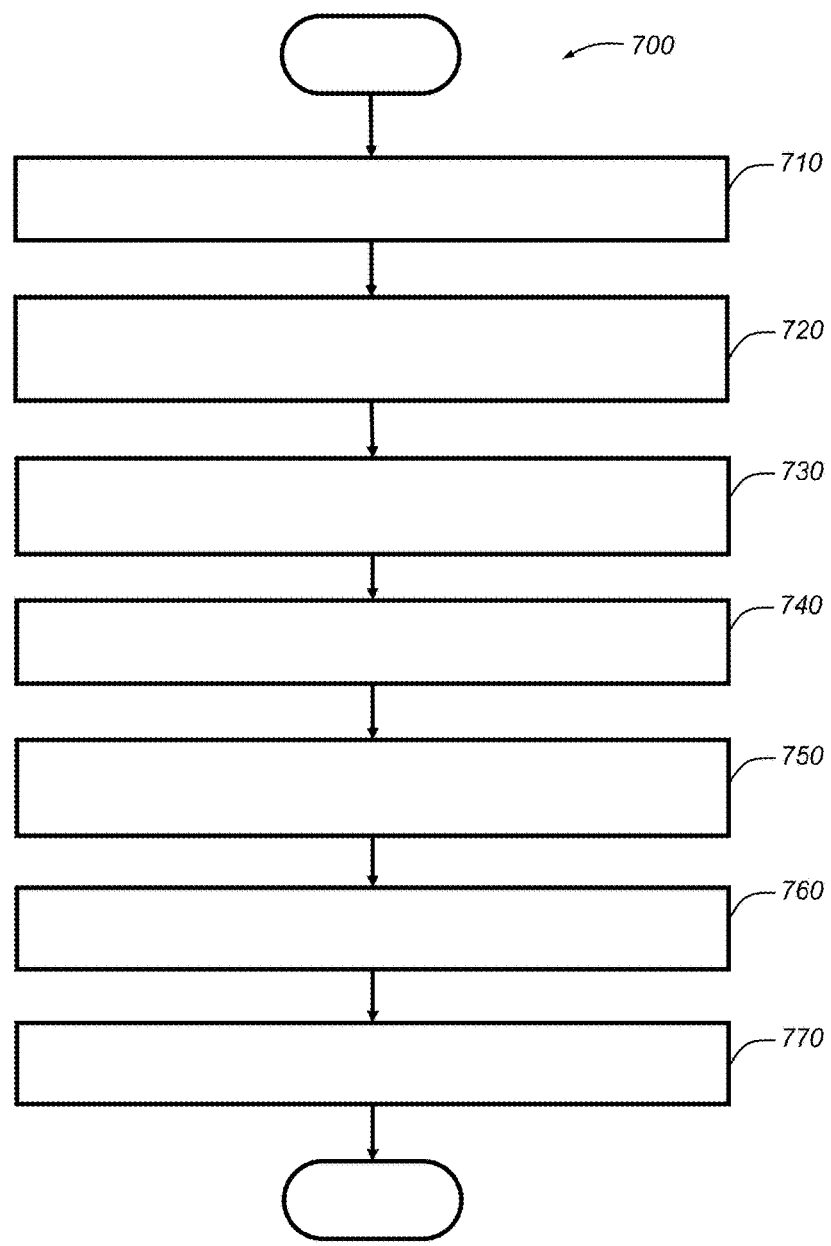
FIG. 7 is a flowchart of another embodiment of a method of enabling a vehicle to be operated as a part of a vehicle reservation.

With reference to FIG. 7, there is shown an embodiment of a method 700 of enabling a vehicle to be operated as a part of a vehicle reservation. In one embodiment, the method 700 can be carried out by the vehicle electronics module 200. In other embodiments, the method 700 can be carried out by both the vehicle electronics module 100 and the vehicle electronics module 200. Although the steps of the method 700 are described as being carried out in a particular order, it is hereby contemplated that the steps of the method 700 can be carried out in any suitable or technically feasible order as will be appreciated by those skilled in the art.

In many embodiments, the method 700 can begin after the method 500 is carried out or after another vehicle reservation establishment process is carried out. Also, the method 700 can be carried out by the vehicle electronics module 200 (and/or the vehicle electronics module 100) that is installed in the second PEPS-vehicle 14. In many embodiments, the vehicle electronics module 200 can be readily installed in the vehicle 14 through plugging the vehicle electronics module 200 into the auxiliary power port 48 of the vehicle 14. Also, prior to the method 700 and/or prior to the method 500, the vehicle electronics module 200 can carry out a setup process with the vehicle 14, which may include the exchange of information over a SRWC connection (e.g., a BLE connection). For example, the vehicle sharing 200 and the vehicle 14 can carry out an initial SRWC connection establishment process or a pairing process in which the vehicle electronics module 200 and the vehicle 14 (specifically, for example, the wireless communications device 30) establish a connection and then store connection information, such as a shared key that can be generated as a part of the initial SRWC connection establishment process or the pairing process. Moreover, as a part of the setup, other information can be shared between the vehicle electronics module 200 and the vehicle 14.

Additionally, the vehicle electronics module 200 can be registered with a vehicle backend services facility, such as remote facility 80. In some embodiments, this registration can be carried out automatically by the vehicle electronics module 200 and the vehicle 12, which can occur as a part of the initial setup. In other embodiments, a vehicle owner or primary operator can register the vehicle electronics module 200 through use of a website, computer application, or web-portal. This can include the vehicle owner or primary operator inputting information into a user interface regarding the vehicle electronics module 200 and/or user information, as well as other information. Once the vehicle electronics module 200 has been installed, setup, and/or registered, the vehicle electronics module 200 can be said to be ready for use as a part of the peer-to-peer (P2P) vehicle sharing network.

The method 700 begins with step 710, wherein the vehicle electronics module can transmit an advertisement. The advertisement can be similar or the same as the advertisement that is transmitted in step 610 of the method 600 discussed above, and/or the advertisement can be transmitted in a like manner as the advertisement that is transmitted in step 610 of the method 600 (FIG. 6). For example, the advertisement can include personal SRWC device identification information, a reservation identifier, and/or vehicle identification information. This advertisement can be transmitted using a SRWC protocol or technology, which can be the same or different as the SRWC used in step 740 (discussed below). In the case that the SRWC protocol or technology used in this step (710) to transmit the advertisement is the same as the SRWC used in step 740, a different channel can be used to transmit the advertisement. Also, other modulation and/or channel separation techniques can be used, such as those implemented by the particular SRWC protocol or technology that is being used. The method 700 continues to step 720.

In step 720, a response is received at the vehicle electronics module from the personal SRWC device. The response can be similar or the same as the response that is transmitted in step 620 of the method 600 discussed above, and/or the response can be transmitted (or received) in a like manner as the response that is received in step 620 of the method 600 (FIG. 6). For example, the response can be received at the vehicle electronics module 200 from the personal SRWC device 90. The method 700 continues to step 730.

In step 730, a short-range wireless communication (SRWC) connection is established between the vehicle electronics module and the personal SRWC device. The SRWC connection can be established in a similar or the same manner as the SRWC connection of step 630 of the method 600. The connection establishment process may include a BLE pairing process that can use reservation information as part of an out-of-band pairing process. Moreover, in some embodiments, the steps 710 and 720 may be considered as a part of the SRWC connection establishment process. The method 700 continues to step 740.

In step 740, a short-range wireless communication (SRWC) connection is established between the vehicle electronics module and the vehicle. The SRWC connection can be established using various SRWC technologies, such as BLE, Wi-Fi™, and/or Wi-Fi Direct™. In one embodiment, a BLE pairing process can be carried out as a part of the initial setup or configuration as discussed above. This BLE pairing process can include the generation of secret information (e.g., a secret key), that can then be stored for later use at the vehicles sharing module 200 and the wireless communications device 30 (or other VSM of the vehicle 14). This secret information can be used to establish the SRWC connection between the vehicle electronics module 200 and the wireless communications device 30 at later times, such as during this step. In one embodiment, the SRWC connection between the vehicle electronics module and the vehicle can be carried out in response to (or after) the SRWC connection is established between the vehicle electronics module and the personal SRWC device.

In some instances, the vehicle electronics module 200 and the wireless communications device 30 can maintain a SRWC connection even at times when the vehicle 14 and/or the vehicle electronics module 200 are not in use (or are not active). In other embodiments, the vehicle 14 can send a message to the vehicle electronics module 200 at or near a start time of the reservation that was established in the reservation establishment process (e.g., the method 500). Then, the vehicle electronics module 200 can respond and subsequent communications can be used to establish the SRWC connection. In some embodiments, an additional authentication process can be carried out after the SRWC connection is established so that the vehicle 14 can better ensure that the vehicle electronics module 200 is authentic and/or authorized for use with the vehicle 14. This authentication process can be carried out over the established SRWC connection, at least in some embodiments. In other embodiments, the vehicle electronics module 100 can be used with the vehicle electronics module 200 and, in at least some of these embodiments, step 740 may include establishing a secure connection between the vehicle electronics module 100 and the vehicle electronics module 200.

Also, in some embodiments, the vehicle 14 can send reservation information to the vehicle electronics module 200 using the established SRWC connection. In a particular embodiment, this reservation information can be sent only after successful verification of the authentication information. The reservation information can include vehicle identification information, a reservation identifier, and/or personal SRWC device identification information. The method 700 continues to step 750.

In step 750, an authentication process can be carried out. In many embodiments, the authentication process can be carried out in addition to the connection establishment process, which can contain its own authentication process (e.g., using out-of-band information). The authentication process can be similar or the same as the authentication process of step 640 of the method 600 (FIG. 6). For example, authentication information can be communicated by the personal SRWC device 90 over the established SRWC connection to the vehicle electronics module 200. The vehicle electronics module 200 can then verify this authentication information with a digital certificate stored thereon, or through the use of other authentication stored thereon. In some embodiments, the authentication information stored on the vehicle electronics module 200 can be received at the vehicle electronics module 200 via the wireless communications module 30 as a part of a reservation establishment process (e.g., the method 500), or may be pre-stored thereon. Pre-storing of the authentication information can be carried out at the time of manufacture or distribution of the vehicle electronics module 200 or may be stored thereon as a part of the installation and/or setup process discussed above. The method 700 continues to step 760.

In step 760, the vehicle doors of the vehicle are unlocked. In many embodiments, this step can be carried out after and/or in response to successful verification of the authentication information (step 750). In many embodiments, the vehicle electronics module 200 can supply power to the keyfob circuit 214, which can enable and/or can cause the keyfob circuit 214 to transmit a door unlock command. The door unlock command can then be received by the PEPS module 44 of the vehicle 14, which can then verify authorization and/or authentication information conveyed in the door unlock command. Additionally or alternatively, the verification can include determining whether the present time is at or near the reservation start time, which can be done through use of GNSS signals received by the GNSS receiver 216. Upon successful verification of this information, the PEPS module 44 can unlock at least one vehicle door, which can include sending a door unlock message to the BCM 24 of the vehicle 14. In other embodiments, a door unlock command can be transmitted by the SRWC circuit 202 to the vehicle 12, which can cause the doors to unlock, for example, via use of the BCM 24. The method 700 continues to step 770.

In step 770, the vehicle is enabled for start. In one embodiment, this step can include powering the keyfob circuit 214 such that the keyfob circuit 214 is responsive to a signal transmitted by the PEPS module 44 of the vehicle. The PEPS module 214 may transmit a signal, such as a low frequency signal, when a user presses a vehicle start pushbutton of the vehicle (and/or has engaged a brake of the vehicle). The keyfob circuit 214 may not be supplied power or electrical charge from the battery 212 or the power supply 204 prior to the authentication process of the step 750. However, once the personal SRWC device 90 is successfully authenticated, the vehicle electronics module 200 can provide power (or electrical charge) to the keyfob circuit 214, which can enable the keyfob for use with the PEPS module 44 of the vehicle 14. The keyfob circuit 214 can send a response signal, such as a high frequency signal, to the PEPS module 44 in response to receiving the low frequency signal from the PEPS module 44. The PEPS module 44 can receive this response signal and then can start the vehicle 14, which can include sending a command (or other information) to a vehicle system module (VSM), such as the BCM 24 or the ECM 26. It should be appreciated that the term "high frequency signal" and "low frequency signal" can be any radio frequency (RF) signals such that the low frequency signal includes a lower frequency than the high frequency signal that is sent in response to the low frequency signal. Of course, other embodiments may employ frequencies of a different nature.

In some embodiments, a vehicle disable block (VDB) of the vehicle 14 can be set remotely (or locally) prior to the method 700 such that the vehicle is prevented from being started even by a user with an authorized and/or authentic vehicle key. This VDB can be set by the remote facility 80, which can be a backend vehicle services facility. The VDB can be cleared remotely by the remote facility upon receiving an indication that the personal SRWC device 90 is at the vehicle and that the personal SRWC device 90 has successfully been authenticated.

In another embodiment, the vehicle 14 can include both the vehicle electronics module 100 and the vehicle electronics module 200. In at least one embodiment, when the vehicle electronics module 100 is used with the vehicle electronics module 200 within a single vehicle, the vehicle electronics module 100 can include the electrical components 102-110, but the components, namely the microcontroller 106 and memory 110, can be configured in a different manner, such as in the manner discussed below. In this embodiment, the step 740 can instead include establishing a SRWC connection between the vehicle electronics module 100 and the vehicle electronics module 200. The vehicle electronics module 100 can be connected to the OBD II port 42 of the vehicle 14. Once the personal SRWC device 90 is successfully authenticated in step 750 by the vehicle electronics module 200, the vehicle electronics module 200 can inform the vehicle electronics module 100 of this successfully authentication. Then, the vehicle electronics module 100 sends a VDB clear command over the OBD II connection to the vehicle 14, such as to the BCM 24. The VDB is then cleared by the BCM 24 thereby enabling the vehicle 14 for start. It should be appreciated that the VDB can be set locally by the vehicle electronics module 100 prior to the reservation, or may be set remotely by the remote facility 80 prior to the reservation. As mentioned above, once the vehicle is enabled for start, the P2P user (e.g., the P2P vehicle renter) can press a vehicle start pushbutton, which can then communicate with the keyfob circuit 214 of the vehicle electronics module 200 thereby causing the vehicle 14 to start. It should be appreciated that, in many embodiments, a separate passive vehicle key need not be included in the vehicle since the vehicle electronics module 200 includes a keyfob circuit 214, which can be considered a passive vehicle key itself. Also, in at least some embodiments, a door unlock command (step 760) can be sent from the vehicle electronics module 200 to the vehicle electronics module 100 and, then, from the vehicle electronics module 100 to the BCM 24. The method 700 then ends.

Moreover, in either the method 600 or the method 700, the vehicle 12 (or 14) can set the VDB whenever the P2P leaves the vehicle and/or locks the vehicle using a vehicle key, such as their personal SRWC device 90. For example, the P2P user (e.g., the P2P vehicle renter) can use the vehicle-device application 92 of the personal SRWC device 90 to send a lock vehicle door command to the vehicle 12, which can be received at either or both of the vehicle electronics module 100 or the vehicle electronics module 200 (depending on the particular embodiment, as discussed above). At this time, in the case that the vehicle electronics module 200 receives the lock vehicle door command, the vehicle electronics module 200 can send a VDB set command to the vehicle electronics module 100, which can then set the VDB of the vehicle. The vehicle electronics module 200 can use the keyfob circuit 200 to then lock the vehicle doors. Or, in another embodiment the vehicle electronics module 200 can receive the door lock command and then send the same or a different door lock command to the vehicle electronics module 100 along with the VDB set command (which can be a part of the same or a different message). In other embodiments, such as those where the vehicle 12 is used with a single vehicle electronics module 100, the vehicle electronics module 100 can receive the door lock command and, in response to receiving this command, the vehicle electronics module 100 can sent a door lock command and a VDB set command to the BCM 24 (or other VSM of the vehicle 12).

Additionally, the methods 600 and/or 700 can be used for non-PEPS-vehicles, such as the non-PEPS-vehicle 16. These methods can be carried out in the same manner, except that a PEPS module and a passive vehicle key would not be used as a part of steps 650, 660, 760, and 770. Moreover, the vehicle 16 can include the SRWC-lockbox 300 discussed above, which can include a (non-passive) physical key in the compartment 312. In the case of method 600 which uses the vehicle electronics module 100, after the personal SRWC device 90 is authenticated in step 640, the vehicle electronics module 100 can send an unlock message to the SRWC-lockbox 300 thereby causing the SRWC-lockbox 300 to unlock the compartment 312 and thereby permitting the P2P vehicle renter access the physical key 17. The physical key 17 can then be inserted into a key ignition slot of the vehicle 16 and used to start the vehicle 16. In this embodiment, the vehicle electronics module 100 and the SRWC-lockbox 300 can form a SRWC connection. This SRWC connection can be initiated at the time of the reservation (or right before the reservation). The unlock message sent from the vehicle electronics module 100 to the SRWC-lockbox 300 can be sent over this established SRWC connection, which can be a BLE connection at least in some embodiments. Although this embodiment of the SRWC-lockbox 300 in conjunction with the vehicle electronics module 100 is described with respect to non-PEPS-vehicle 16, it should be appreciated that the SRWC-lockbox 300 can be used with the vehicle electronics module 100 for PEPS-vehicles, such as vehicle 12. In these instances, the SRWC-lockbox 300 can securely protect a physical passive key, such as a keyfob.

In the case of the method 700 which uses the vehicle electronics module 200 (and/or a separate vehicle electronics module 100), the step 760 can be modified for the non-PEPS-vehicle 16 such that the vehicle electronics module 200 sends a vehicle door unlock command to the vehicle electronics module 100, which can then send a door unlock command to the BCM 24 via the OBD II connection. Or, in other embodiments, the vehicle electronics module 200 can send a door unlock command to the vehicle via the wireless communications unit 30. Also, in step 770, the vehicle electronics module 200 can send an unlock message to the SRWC-lockbox 300 thereby causing the SRWC-lockbox 300 to unlock the compartment 312 and thereby permitting the P2P user to access the physical key 17. Moreover, a SRWC connection can first be established by the SRWC-lockbox 300 and the vehicle electronics module 200 via SRWCs such as BLE. The unlock message sent from the vehicle electronics module 100 to the SRWC-lockbox 300 can be sent over this established SRWC connection.

In one embodiment, the method 500, the method 600, the method 700, and/or parts thereof can be implemented in one or more computer programs (or "applications", or "scripts") embodied in a computer readable medium and including instructions usable (e.g., executable) by one or more processors of the one or more computers of one or more systems. The computer program(s) may include one or more software programs comprised of program instructions in source code, object code, executable code, or other formats. In one embodiment, any one or more of the computer program(s) can include one or more firmware programs and/or hardware description language (HDL) files. Furthermore, the computer program(s) can each be associated with any program related data and, in some embodiments, the computer program(s) can be packaged with the program related data. The program related data may include data structures, look-up tables, configuration files, certificates, or other relevant data represented in any other suitable format. The program instructions may include program modules, routines, programs, functions, procedures, methods, objects, components, and/or the like. The computer program(s) can be executed on one or more computers, such as on multiple computers that are in communication with one another.

The computer program(s) can be embodied on computer readable media (e.g., memory of one or more servers at the remote facility 80, memory 110 of the vehicle electronics module 100, memory 210 of the vehicle electronics module 200), which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A plug-in vehicle electronics module for use in vehicle sharing systems, comprising a power supply and a housing that contains:
   a keyfob circuit that includes a radio frequency (RF) transmitter, wherein the keyfob circuit is configured to transmit one or more radio signals to a passive entry passive start (PEPS) module of the vehicle when the keyfob circuit is powered;
   a short-range wireless communication (SRWC) circuit that is separate from the keyfob circuit;
   a microcontroller; and
   memory communicatively coupled to the microcontroller, wherein the memory stores a computer program;
   wherein the vehicle electronics module is connectable by the power supply to an auxiliary power source on a vehicle; and
   wherein, when the vehicle electronics module is connected to the auxiliary power source, the microcontroller operates under control of the computer program to cause the vehicle electronics module to:
      establish a short-range wireless communication (SRWC) connection with a personal SRWC device using the SRWC circuit;
      authenticate the personal SRWC device in response to receiving authentication information over the established SRWC connection; and
      in response to the successful authentication of the personal SRWC device:
         power the keyfob circuit, wherein the powering of the keyfob circuit causes a passive entry passive start (PEPS) module to unlock a vehicle door of the vehicle; and
         enable a vehicle user to start a primary propulsion system of the vehicle.

2. The vehicle electronics module of claim 1, wherein the vehicle electronics module further comprises a battery that supplies power to the microcontroller when power is not being supplied by the power supply.

3. The vehicle electronics module of claim 2, wherein the power supply provides electrical charge from the auxiliary power source of the vehicle to the microcontroller when the power supply is coupled to the auxiliary power source and when vehicle electronics of the vehicle is in a powered on mode such that power is being supplied to the auxiliary power source.

4. The vehicle electronics module of claim 3, wherein the vehicle electronics module is configured to charge the battery using the auxiliary power source of the vehicle via the power supply when the vehicle is in a powered on mode such that power is being supplied to the auxiliary power source.

5. The vehicle electronics module of claim 1, wherein the vehicle electronics module includes light emitting diode (LED) indicators, wherein the microcontroller controls the emission of light through the LED indicators.

6. The vehicle electronics module of claim 1, wherein the microcontroller, when executing the computer program, further causes the vehicle electronics module to transmit an advertisement from the SRWC circuit.

7. The vehicle electronics module of claim 1, wherein the microcontroller, when executing the computer program, further causes the vehicle electronics module to establish a second short-range wireless communication (SRWC) connection with another vehicle electronics module that is connected to an on-board diagnostics (OBD) port of the vehicle.

8. The vehicle electronics module of claim 1, wherein the vehicle electronics module further comprises a global navigation satellite system (GNSS) receiver.

9. A method of enabling a vehicle to be operated as a part of a vehicle reservation, the method comprising:
- establishing a short-range wireless communication (SRWC) connection with a personal SRWC device;
- receiving reservation information at a vehicle electronics module, wherein the vehicle electronics module is an aftermarket device and is separate from original equipment manufacturer (OEM) vehicle electronics installed on the vehicle, and wherein the vehicle electronics module includes a short-range wireless communication (SRWC) circuit and a keyfob circuit that is separate from the SRWC circuit;
- carrying out an authentication process with the personal SRWC device using the vehicle electronics module, wherein the authentication process is carried out over the established SRWC connection; and
- upon successful authentication of the personal SRWC device:
  - sending a door unlock command to the vehicle from the keyfob circuit of the vehicle electronics module to a passive entry passive start (PEPS) module of the vehicle; and
  - enabling the vehicle for starting a primary propulsion system of the vehicle.

10. The method of claim 9, wherein the method further comprises transmitting an advertisement in response to receiving the reservation information, and wherein the establishing step is carried out after the personal SRWC device responds to the advertisement.

11. The method of claim 9, wherein the enabling step includes sending a vehicle disable block (VDB) clear command to the vehicle.

12. The method of claim 9, wherein the vehicle electronics module includes a power supply that is configured to connect to an auxiliary power port.

13. The method of claim 12, wherein the enabling step includes powering the keyfob circuit upon successful authentication of the personal SRWC device.

* * * * *